United States Patent
Bigler

(10) Patent No.: US 10,369,453 B2
(45) Date of Patent: Aug. 6, 2019

(54) PITCH-PROPELLED VEHICLE

(71) Applicant: Equalia LLC, Mountain View, CA (US)

(72) Inventor: Robert A. Bigler, Cupertino, CA (US)

(73) Assignee: EQUALIA LLC, Mountain View, CA (US)

( * ) Notice: Subject to any disclaimer, the term of this patent is extended or adjusted under 35 U.S.C. 154(b) by 0 days.

(21) Appl. No.: 15/677,641

(22) Filed: Aug. 15, 2017

(65) Prior Publication Data

US 2017/0361205 A1 Dec. 21, 2017

Related U.S. Application Data

(63) Continuation-in-part of application No. 15/474,542, filed on Mar. 30, 2017, now Pat. No. 9,993,718, which is a continuation of application No. 15/008,238, filed on Jan. 27, 2016, now Pat. No. 9,643,077, which is a continuation-in-part of
(Continued)

(51) Int. Cl.
| | |
|---|---|
| A63C 17/08 | (2006.01) |
| A63C 17/01 | (2006.01) |
| A63C 17/12 | (2006.01) |
| B62K 11/00 | (2006.01) |
| A63C 17/26 | (2006.01) |

(Continued)

(52) U.S. Cl.
CPC ............ *A63C 17/08* (2013.01); *A63C 17/014* (2013.01); *A63C 17/016* (2013.01); *A63C 17/12* (2013.01); *A63C 17/265* (2013.01); *B60L 50/52* (2019.02); *B62K 11/007* (2016.11); *A63C 2203/10* (2013.01); *A63C 2203/12* (2013.01); *A63C 2203/18* (2013.01); *B60L 2200/14* (2013.01); *B60L 2260/34* (2013.01); *B62D 37/00* (2013.01); *Y02T 10/7005* (2013.01)

(58) Field of Classification Search
CPC ..... A63C 17/12; B60W 40/11; B60W 40/112; B60W 2040/133; B60W 2040/1338; B62K 11/007
USPC .................................................. 180/180, 181
See application file for complete search history.

(56) References Cited

U.S. PATENT DOCUMENTS

| | | | |
|---|---|---|---|
| 2,546,604 A | 5/1948 | Lafky | |
| 2,918,296 A | 9/1957 | Goodale | |

(Continued)

FOREIGN PATENT DOCUMENTS

| | | |
|---|---|---|
| CN | 1689895 A | 11/2005 |
| CN | 101821122 A | 9/2010 |

(Continued)

OTHER PUBLICATIONS

Office Action from the Chinese Application No. CN2014800577286.
(Continued)

*Primary Examiner* — Jeffrey J Restifo
(74) *Attorney, Agent, or Firm* — Haverstock & Owens LLP

(57) ABSTRACT

A method, system and apparatus for carrying a user including a board for supporting the user, a plurality of ground-contacting members coupled with the board, a motorized drive assembly coupled with the ground-contacting members and one or more sensors coupled with the drive assembly. In operation, the drive assembly adjusts the velocity of the ground-contacting member based on one or more distances of the board from a surface below the board as detected by the sensors.

23 Claims, 17 Drawing Sheets

Related U.S. Application Data application No. 14/936,572, filed on Nov. 9, 2015, which is a continuation of application No. 14/058,937, filed on Oct. 21, 2013, now Pat. No. 9,211,470.

(51) Int. Cl.
*B60L 50/52* (2019.01)
*B62D 37/00* (2006.01)

(56) References Cited

U.S. PATENT DOCUMENTS

| | | | |
|---|---|---|---|
| 3,236,537 A | 2/1966 | Eckman | |
| 3,512,798 A | 5/1970 | Siegel | |
| 3,583,722 A | 6/1971 | Jacobson | |
| 3,860,254 A | 1/1975 | Wegener | |
| 4,073,356 A | 2/1978 | Schlicht | |
| 4,106,786 A | 8/1978 | Talbott | |
| 4,795,181 A | 1/1989 | Armstrong | |
| 4,824,139 A | 4/1989 | Robbins | |
| 4,991,066 A | 2/1991 | McCowan | |
| 5,181,731 A | 1/1993 | Gustavsen | |
| D355,945 S | 2/1995 | Homma | |
| 5,701,965 A | 12/1997 | Kamen et al. | |
| 5,769,438 A | 1/1998 | Svetlov | |
| 5,791,425 A | 8/1998 | Kamen et al. | |
| 5,839,737 A | 11/1998 | Kruczek | |
| 5,971,091 A | 10/1999 | Kamen et al. | |
| 6,017,297 A | 1/2000 | Collins | |
| 6,050,357 A | 4/2000 | Staelin et al. | |
| 6,131,931 A | 10/2000 | Globerson et al. | |
| 6,288,505 B1* | 9/2001 | Heinzmann | A63C 17/12 180/181 |
| 6,302,230 B1 | 10/2001 | Kamen et al. | |
| 6,311,795 B1 | 11/2001 | Skotnikov et al. | |
| 6,338,022 B1 | 1/2002 | Shinmura | |
| 6,367,817 B1 | 4/2002 | Kamen et al. | |
| 6,408,240 B1 | 6/2002 | Morrell et al. | |
| 6,543,564 B1 | 4/2003 | Kamen et al. | |
| 6,581,714 B1 | 6/2003 | Kamen et al. | |
| 6,651,763 B1 | 11/2003 | Kamen et al. | |
| 6,651,766 B2 | 11/2003 | Kamen et al. | |
| 6,779,621 B2* | 8/2004 | Kamen | B60L 15/2045 180/218 |
| 6,789,640 B1* | 9/2004 | Arling | A63C 17/12 180/218 |
| 6,796,394 B1 | 9/2004 | Lin | |
| 6,796,396 B2 | 9/2004 | Kamen et al. | |
| 6,802,636 B1 | 10/2004 | Bailey, Jr. | |
| 6,827,163 B2* | 12/2004 | Amsbury | B60L 15/2045 180/218 |
| 6,848,527 B2 | 2/2005 | Nelson | |
| 6,866,107 B2 | 3/2005 | Heinzmann et al. | |
| 6,874,591 B2 | 4/2005 | Morrell et al. | |
| D505,468 S | 5/2005 | Mejia | |
| D505,469 S | 5/2005 | Joung et al. | |
| D505,470 S | 5/2005 | Hong | |
| 7,053,288 B2 | 5/2006 | Iwai et al. | |
| 7,172,044 B2 | 2/2007 | Bouvet | |
| 7,363,993 B2* | 4/2008 | Ishii | A63C 17/08 180/7.1 |
| 7,370,713 B1 | 5/2008 | Kamen | |
| D580,132 S | 11/2008 | Lin | |
| 7,467,681 B2 | 12/2008 | Hiramatsu | |
| 7,479,097 B2 | 1/2009 | Rosborough et al. | |
| 7,481,291 B2* | 1/2009 | Nishikawa | B62K 17/00 180/181 |
| 7,708,289 B2 | 5/2010 | Jaime, Sr. | |
| 7,739,076 B1 | 6/2010 | Vock et al. | |
| 7,811,217 B2* | 10/2010 | Odien | A63B 21/0058 482/147 |
| 7,840,378 B2 | 11/2010 | Vock et al. | |
| 7,866,429 B2 | 1/2011 | Ishii et al. | |
| D633,584 S | 3/2011 | Hong | |
| 7,976,034 B1 | 7/2011 | Hong et al. | |
| D647,991 S | 11/2011 | Sramek | |
| 8,170,780 B2 | 5/2012 | Field et al. | |
| 8,224,524 B2* | 7/2012 | Nakashima | G05D 1/0891 180/280 |
| 8,225,891 B2* | 7/2012 | Takenaka | B62K 11/007 180/7.1 |
| 8,256,545 B2 | 9/2012 | Oikawa | |
| 8,271,185 B2* | 9/2012 | Doi | B60L 15/2036 180/165 |
| 8,285,474 B2* | 10/2012 | Doi | B62D 37/00 180/206.2 |
| 8,459,670 B1 | 6/2013 | Tizzone | |
| 8,467,941 B2 | 6/2013 | Field et al. | |
| 8,469,376 B2 | 6/2013 | Kristiansen | |
| 8,562,386 B2 | 10/2013 | Carlson et al. | |
| 8,613,455 B2 | 12/2013 | Berrett et al. | |
| 8,616,313 B2 | 12/2013 | Simeray et al. | |
| 8,666,575 B2* | 3/2014 | Kosaka | B62K 11/007 701/124 |
| D704,786 S | 5/2014 | Tang | |
| 8,731,865 B2 | 5/2014 | Vock et al. | |
| 8,738,278 B2* | 5/2014 | Chen | B62K 11/007 701/124 |
| D709,154 S | 7/2014 | Brotherson | |
| 8,827,286 B2 | 9/2014 | Woncik | |
| 8,830,048 B2 | 9/2014 | Kamen et al. | |
| 8,910,959 B2 | 12/2014 | Alva | |
| 9,010,474 B2* | 4/2015 | Martinelli | B62D 51/02 180/218 |
| 9,101,817 B2 | 8/2015 | Doerksen | |
| 9,211,470 B2* | 12/2015 | Bigler | A63C 17/12 |
| 9,216,764 B2 | 12/2015 | Ito et al. | |
| D746,928 S | 1/2016 | Doerksen | |
| 9,265,244 B2 | 2/2016 | Vandergraff | |
| 9,376,155 B2* | 6/2016 | Ying | B62D 51/001 |
| 9,400,502 B2 | 7/2016 | Kamen et al. | |
| 9,452,345 B2 | 9/2016 | Doerksen | |
| D768,252 S | 10/2016 | Bigler | |
| D769,997 S | 10/2016 | Doerksen | |
| 9,477,228 B2 | 10/2016 | Field et al. | |
| 9,598,141 B1* | 3/2017 | Doerksen | B62M 7/12 |
| 9,604,692 B1* | 3/2017 | Kim | B62K 23/08 |
| 9,643,077 B2* | 5/2017 | Bigler | A63C 17/014 |
| 9,656,688 B2 | 5/2017 | Ying | |
| 9,707,470 B2* | 7/2017 | Ma | B62K 11/007 |
| D795,374 S | 8/2017 | Bigler | |
| 9,745,013 B2* | 8/2017 | Wood | B62K 11/007 |
| 9,840,302 B2* | 12/2017 | Zeng | B62K 11/007 |
| 9,891,624 B2* | 2/2018 | Murakami | G05D 1/02 |
| 9,908,579 B2* | 3/2018 | Zuo | B60L 3/12 |
| 9,908,580 B2* | 3/2018 | Doerksen | B62K 11/007 |
| 9,957,011 B2* | 5/2018 | Jiang | B62K 11/007 |
| 9,999,827 B2* | 6/2018 | Wood | A63C 17/12 |
| 10,010,784 B1* | 7/2018 | Doerksen | A63C 17/0046 |
| 10,035,557 B2* | 7/2018 | Chang | B62K 5/01 |
| 10,040,503 B2* | 8/2018 | Chen | B62K 11/007 |
| 10,046,796 B2* | 8/2018 | Oikawa | B62K 11/007 |
| 10,046,824 B2* | 8/2018 | Zhang | B60K 7/0007 |
| 10,058,765 B2* | 8/2018 | Ma | A63C 17/014 |
| 10,059,397 B2* | 8/2018 | Zheng | B62K 11/007 |
| 2001/0032743 A1 | 10/2001 | Kamen et al. | |
| 2003/0155167 A1 | 8/2003 | Kamen et al. | |
| 2004/0005958 A1 | 1/2004 | Kamen et al. | |
| 2004/0007399 A1 | 1/2004 | Heinzmann et al. | |
| 2004/0055795 A1 | 3/2004 | Kamen et al. | |
| 2004/0065494 A1 | 4/2004 | Nelson | |
| 2005/0092533 A1 | 5/2005 | Ishii | |
| 2005/0121238 A1* | 6/2005 | Ishii | A63C 17/08 180/65.1 |
| 2005/0121866 A1 | 6/2005 | Kamen et al. | |
| 2005/0241864 A1 | 11/2005 | Hiramatsu | |
| 2005/0242538 A1 | 11/2005 | Hiramatsu | |
| 2006/0012141 A1 | 1/2006 | Bouvet | |
| 2006/0097683 A1 | 5/2006 | Hosoda et al. | |
| 2006/0231313 A1 | 10/2006 | Ishii | |
| 2006/0260862 A1* | 11/2006 | Nishikawa | B62K 17/00 180/315 |
| 2007/0194558 A1 | 8/2007 | Stone et al. | |

(56) References Cited

U.S. PATENT DOCUMENTS

| | | | |
|---|---|---|---|
| 2007/0254789 A1* | 11/2007 | Odien | A63B 21/0058 482/146 |
| 2007/0273118 A1 | 11/2007 | Conrad | |
| 2007/0296170 A1 | 12/2007 | Field | |
| 2010/0033315 A1 | 2/2010 | Kamen et al. | |
| 2010/0038163 A1 | 2/2010 | Oikawa | |
| 2010/0093256 A1 | 4/2010 | Carlson et al. | |
| 2010/0114468 A1 | 5/2010 | Field et al. | |
| 2010/0305840 A1 | 12/2010 | Doi | |
| 2010/0330876 A1 | 12/2010 | Carlson | |
| 2011/0006497 A1 | 1/2011 | Chen et al. | |
| 2011/0095454 A1 | 4/2011 | Phiipp et al. | |
| 2011/0295454 A1 | 12/2011 | Meyers | |
| 2011/0309772 A1 | 12/2011 | Forgey | |
| 2012/0007331 A1 | 1/2012 | Hsieh | |
| 2012/0068427 A1 | 3/2012 | Alva | |
| 2012/0098432 A1 | 4/2012 | Recker et al. | |
| 2012/0166048 A1* | 6/2012 | Inoue | G05D 1/0061 701/49 |
| 2012/0187648 A1 | 7/2012 | Chen | |
| 2012/0256386 A1 | 10/2012 | Benarrouch | |
| 2013/0049317 A1 | 2/2013 | Cheek | |
| 2013/0175943 A1 | 7/2013 | Tackett | |
| 2013/0238231 A1* | 9/2013 | Chen | B62K 11/007 701/124 |
| 2013/0248573 A1* | 9/2013 | Kim | A45F 4/02 224/576 |
| 2013/0329439 A1 | 12/2013 | Hellkamp | |
| 2014/0058600 A1 | 2/2014 | Hoffmann et al. | |
| 2014/0236426 A1 | 8/2014 | Kosaka et al. | |
| 2014/0326525 A1* | 11/2014 | Doerksen | A63C 17/12 180/181 |
| 2015/0046002 A1 | 2/2015 | Shih et al. | |
| 2015/0066276 A1 | 3/2015 | Nakashima et al. | |
| 2015/0107922 A1 | 4/2015 | Bigler | |
| 2015/0151807 A1 | 6/2015 | Kamen et al. | |
| 2015/0234384 A1 | 8/2015 | Taira et al. | |
| 2015/0323935 A1 | 11/2015 | Doerksen | |
| 2016/0059860 A1* | 3/2016 | Kondo | G05D 1/0891 701/70 |
| 2016/0121198 A1* | 5/2016 | Doerksen | A63C 17/01 701/22 |
| 2016/0129963 A1* | 5/2016 | Ying | B62D 51/001 180/6.5 |
| 2016/0136508 A1 | 5/2016 | Bigler | |
| 2016/0291599 A1 | 10/2016 | Doerksen | |
| 2016/0296827 A1 | 10/2016 | Doerksen | |
| 2017/0088212 A1* | 3/2017 | Edney | B60W 40/13 |

FOREIGN PATENT DOCUMENTS

| | | |
|---|---|---|
| CN | 303804687 S | 8/2016 |
| DE | 2648202 A | 4/1978 |
| JP | 07505323 | 6/1995 |
| JP | 2001204811 A | 7/2001 |
| JP | 2007530955 | 11/2007 |
| JP | 2008087674 A | 4/2008 |
| JP | 2009126295 A | 6/2009 |
| JP | 2009286323 A | 12/2009 |
| JP | 2010023613 A | 2/2010 |
| JP | 2010167992 A | 8/2010 |
| JP | 2010188998 A | 9/2010 |
| JP | 2011-057111 A | 3/2011 |
| JP | 4809325 | 8/2011 |
| JP | 2007176455 A | 7/2012 |
| WO | 9320911 | 10/1993 |
| WO | 2012113011 A1 | 8/2012 |

OTHER PUBLICATIONS

Examination Notification dated Mar. 2, 2018 and English translation from Taiwanese Patent Application No. 103134562.
https://web.archive.org/web/20120918062826/http://www.instructables.com/id/Skateboard-with-PIC-microcontroller-and-LEDs/.
Doerksen, Kyle Jonathan, "Self-Stabilizing Skateboard" U.S. Appl. No. 61/820,043 filed May 6, 2013 and Filing Receipt dated Jun. 10, 2013, Confirmation No. 1078.
International Search Report from PCT Application PCT/US17/14674.
Decision of Registration from Japanese Design Application No. 2016-017957.
Examination Notification from Taiwanese Patent Application No. 105304627.
Extended European Search Report from European Application No. 14856497.4.
Office Action dated Dec. 26, 2017 and English translation from Japanese Patent Application No. 2016-525962.
International Preliminary Report on Patentability Report on Patentability (Chapter I of the Patent Cooperation Treaty) dated Aug. 9, 2018 from PCT Patent Application No. PCT/US2017/014674.
Taiwanese Examination Notification dated Aug. 9, 2017, from Taiwanese Patent Application No. 103134562.
Office Action dated Aug. 28, 2018 and English translation from JP Application No. 2016-525962.

* cited by examiner

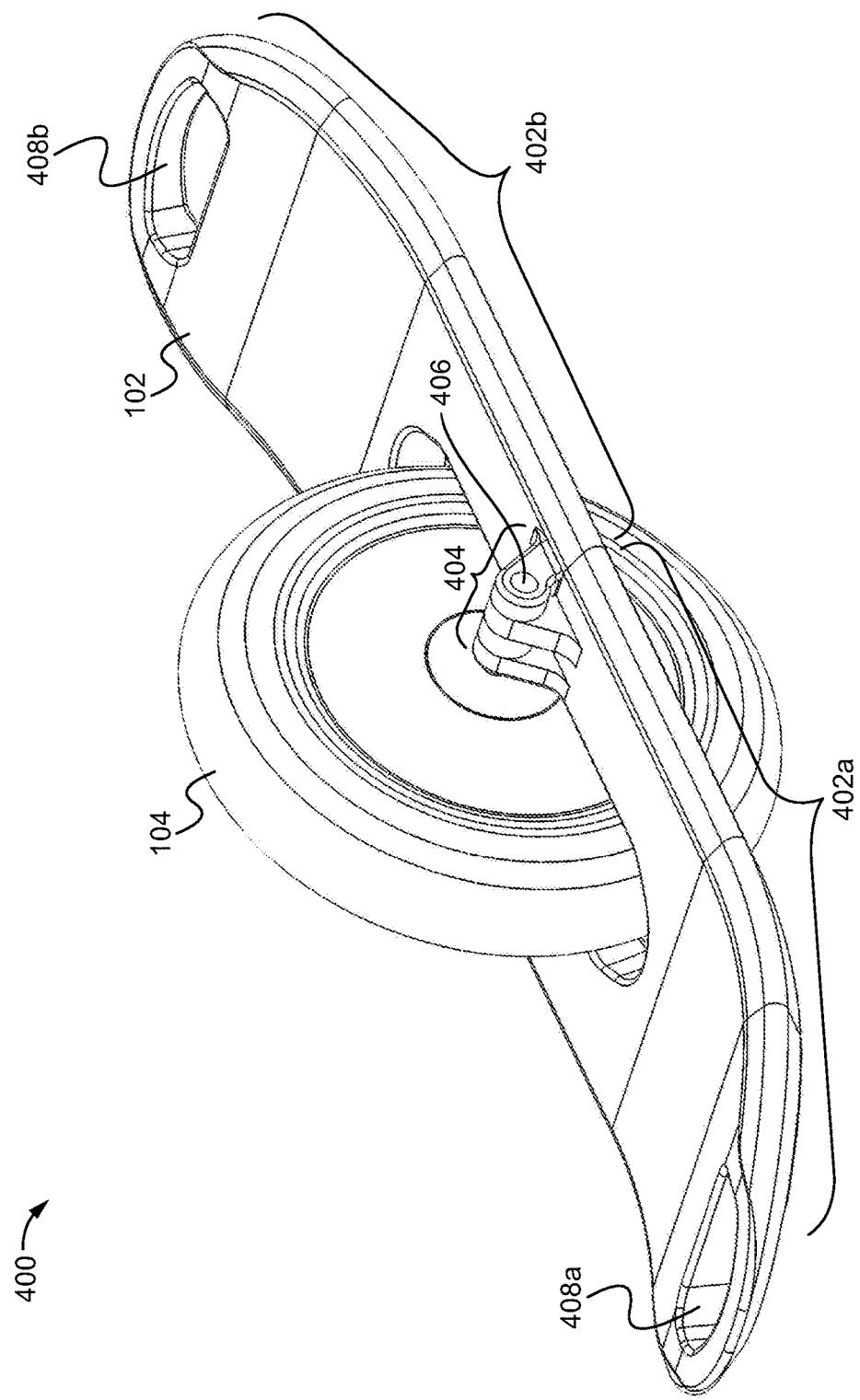

PITCH-PROPELLED VEHICLE

RELATED APPLICATION(S)

This Patent Application is a continuation-in-part of co-pending U.S. patent application Ser. No. 15/474,542, filed Mar. 30, 2017, and titled "PITCH-PROPELLED VEHICLE," which is a continuation of U.S. patent application Ser. No. 15/008,238, filed Jan. 27, 2016, and titled "PITCH-PROPELLED VEHICLE," which is a continuation-in-part of co-pending U.S. patent application Ser. No. 14/936,572, filed Nov. 9, 2015, and titled "PITCH-PROPELLED VEHICLE", which is a continuation of U.S. patent application Ser. No. 14/058,937, filed Oct. 21, 2013, and titled "PITCH-PROPELLED VEHICLE", all of which are hereby incorporated by reference in their entirety.

FIELD OF THE INVENTION

The present invention relates to the field of vehicles. More specifically, the present invention relates to the field of vehicles having pitch-sense based motion.

BACKGROUND OF THE INVENTION

There are many known types of commercial and recreational vehicles for transporting people. Most of these vehicles are designed to be stable with respect to tipping by incorporating three or four wheels that balance and support the user and the remainder of the vehicle. For example, a skateboard is a well known vehicle that uses four wheels that are positioned to create a stable platform for the board and the user in all directions. However, many users enjoy the challenge of riding at least partially unstable vehicles. A scooter is an example of such a partially unstable vehicle because it is stable in the direction of the alignment of the wheels, but can tip side to side perpendicular to the alignment. Similarly, a unicycle, which uses a single wheel, is unstable with respect to tipping in all directions.

Recently, vehicles, such as a segway, have been created that utilize balance assisting systems to not only help stabilize an otherwise unstable vehicle, but also utilize the tipping of the vehicle to control its movement. Although this stabilization and movement control works well on even surfaces, it is unable to adequately operate on or adjust to uneven surfaces which are often encountered when riding such a vehicle. Further, they are able to be both complicated and expensive in design, which increases the likelihood of breaking down, the cost of repairs and the overall cost of manufacture.

SUMMARY OF THE INVENTION

A vehicle for carrying a user including a board for supporting the user, a plurality of ground-contacting members coupled with the board, a motorized drive assembly coupled with the ground-contacting members and one or more sensors coupled with the drive assembly. In operation, the drive assembly adjusts the velocity of the ground-contacting member based on one or more distances of the board from a surface below the board as detected by the sensors.

In one aspect the present application relates to a vehicle for carrying a user. The vehicle comprising a board having an elongated dimension and a shorter dimension perpendicular to the elongated dimension, a first ground-contacting member coupled with the board and configured to rotate about a first axis that is parallel to the shorter dimension, a second ground-contacting member coupled with the board and configured to rotate about a second axis parallel to the shorter dimension, wherein the first and second ground-contacting members are adjacent to each other such that the first axis and the second axis are aligned and one or more motorized drive elements coupled with the first and the second ground-contacting members, wherein the drive elements determine a base rotational speed based on a pitch of the board about the first axis, determine a tilt of the board about the elongated dimension and if the tilt exceeds a threshold value, cause the first ground-contacting member to rotate at a first velocity and the second ground-contacting member to rotate at a second velocity, wherein a difference between the first velocity and the second velocity is based on the tilt. In some embodiments, one or both of the group consisting of the first velocity and the second velocity are different than the base rotational speed in an amount that is based on the tilt. In some embodiments, if the base rotational speed is equal to zero and the tilt exceeds the threshold value, the first velocity has a different direction than the second velocity such that the first ground-contacting member rotates in a different direction than the second ground-contacting member. In some embodiments, the vehicle further comprises one or more tilt sensors coupled with the drive elements, wherein the drive elements determine the tilt with respect to a surface below the board based on one or more distances of the board from the surface as detected by the tilt sensors. In some embodiments, at least one of the tilt sensors is positioned on a first end of the shorter dimension of the board and at least another one of the tilt sensors is positioned on a second end of the shorter dimension of the board that is opposite from the first end. In some embodiments, the tilt is calculated by determining a difference between the one or more distances and an average of two or more of the distances. In some embodiments, the vehicle further comprises one or more gyroscopic sensors coupled with the drive elements, wherein the drive elements determine the tilt with respect to gravity using the gyroscopic sensors. In some embodiments, the vehicle further comprises one or more deflection sensors coupled with the drive elements, wherein the deflection sensors detect a deviation distance from a resting alignment of the first ground-contacting member with respect to the second ground-contacting member and the drive elements determine the tilt based on the detected deviation distance. In some embodiments, the deviation distance is measured in a direction perpendicular to the shorter dimension and the elongated dimension of the board. In some embodiments, the first ground-contacting member and the second ground-contacting member share a single axle that is coupled to the board. In some embodiments, the first ground-contacting member and the second ground-contacting member each have a separate axle such that the axle of the first ground-contacting member and the axle of the second ground-contacting member are able to move with respect to each other. In some embodiments, the vehicle further comprises one or more pitch sensors coupled with the drive elements, wherein the drive elements determine the pitch based on one or more distances of the board from a surface below the board as detected by the pitch sensors. In some embodiments, the board as balanced by the first and second ground-contacting members is unstable with respect to tipping about the first axis when the motorized drive elements are not in operation, and the motorized drive elements are configured to automatically balance the board with respect to tipping about the first axis when the motorized drive elements are in operation.

A second aspect is directed to a method of operating a vehicle having an elongated board. The method comprises providing a vehicle comprising a board having an elongated dimension and a shorter dimension perpendicular to the elongated dimension, a first ground-contacting member coupled with the board and configured to rotate about a first axis that is parallel to the shorter dimension, a second ground-contacting member coupled with the board and configured to rotate about a second axis parallel to the shorter dimension, wherein the first and second ground-contacting members are adjacent to each other such that the first axis and the second axis are aligned and one or more motorized drive elements coupled with the first and the second ground-contacting members, and with the drive elements determining a base rotational speed based on a pitch of the board about the first axis, determining a tilt of the board about the elongated dimension and if the tilt exceeds a threshold value, causing the first ground-contacting member to rotate at a first velocity and the second ground-contacting member to rotate at a second velocity, wherein a difference between the first velocity and the second velocity is based on the tilt. In some embodiments, one or both of the group consisting of the first velocity and the second velocity are different than the base rotational speed in an amount that is based on the tilt. In some embodiments, if the base rotational speed is equal to zero and the tilt exceeds the threshold value, the first velocity has a different direction than the second velocity such that the first ground-contacting member rotates in a different direction than the second ground-contacting member. In some embodiments, the vehicle further comprises one or more tilt sensors coupled with the drive elements, the method further comprising, with the drive elements, determining the tilt with respect to a surface below the board based on one or more distances of the board from the surface as detected by the tilt sensors. In some embodiments, at least one of the tilt sensors is positioned on a first end of the shorter dimension of the board and at least another one of the tilt sensors is positioned on a second end of the shorter dimension of the board that is opposite from the first end. In some embodiments, the tilt is calculated by determining a difference between the one or more distances and an average of two or more of the distances. In some embodiments, the vehicle further comprises one or more gyroscopic sensors coupled with the drive elements, the method further comprising, with the drive elements, determining the tilt with respect to gravity using the gyroscopic sensors. In some embodiments, the vehicle further comprises one or more deflection sensors coupled with the drive elements, the method further comprising, with the deflection sensors detecting a deviation distance from a resting alignment of the first ground-contacting member with respect to the second ground-contacting member, and with the drive elements, determining the tilt based on the detected deviation distance. In some embodiments, the deviation distance is measured in a direction perpendicular to the shorter dimension and the elongated dimension of the board. In some embodiments, the first ground-contacting member and the second ground-contacting member share a single axle that is coupled to the board. In some embodiments, the first ground-contacting member and the second ground-contacting member each have a separate axle such that the axle of the first ground-contacting member and the axle of the second ground-contacting member are able to move with respect to each other. In some embodiments, the vehicle further comprises one or more pitch sensors coupled with the drive elements, the method further comprising, with the drive elements, determining the pitch based on one or more distances of the board from a surface below the board as detected by the pitch sensors. In some embodiments, the board as balanced by the first and second ground-contacting members is unstable with respect to tipping about the first axis when the motorized drive elements are not in operation, and the motorized drive elements are configured to automatically balance the board with respect to tipping about the first axis when the motorized drive elements are in operation.

A third aspect is directed to a motorized skateboard-like vehicle for carrying a user. The vehicle comprises a board having an elongated dimension and a shorter dimension perpendicular to the elongated dimension, a first ground-contacting member coupled with the board and configured to rotate about a first axis that is parallel to the shorter dimension, a second ground-contacting member coupled with the board and configured to rotate about a second axis parallel to the shorter dimension, wherein the first and second ground-contacting members are adjacent to each other such that the first axis and the second axis are aligned, and further wherein the board forms a perimeter around the first and second ground-contacting members, a plurality of distance sensors positioned on a bottom surface of the board and configured to measure a distance between the bottom of the board and a surface below the board and one or more motorized drive elements coupled with the first and the second ground-contacting members, wherein the drive elements determine a base rotational speed based on a pitch of the board about the first axis, determine a tilt of the board about the elongated dimension and if the tilt exceeds a threshold value, cause the first ground-contacting member to rotate at a first velocity and the second ground-contacting member to rotate at a second velocity, wherein a difference between the first velocity and the second velocity is based on the tilt.

BRIEF DESCRIPTION OF THE DRAWINGS

FIG. 4C illustrates an unfolded isometric view of a pitch propelled vehicle with a folding feature according to some embodiments.

DETAILED DESCRIPTION

Figure 1A:
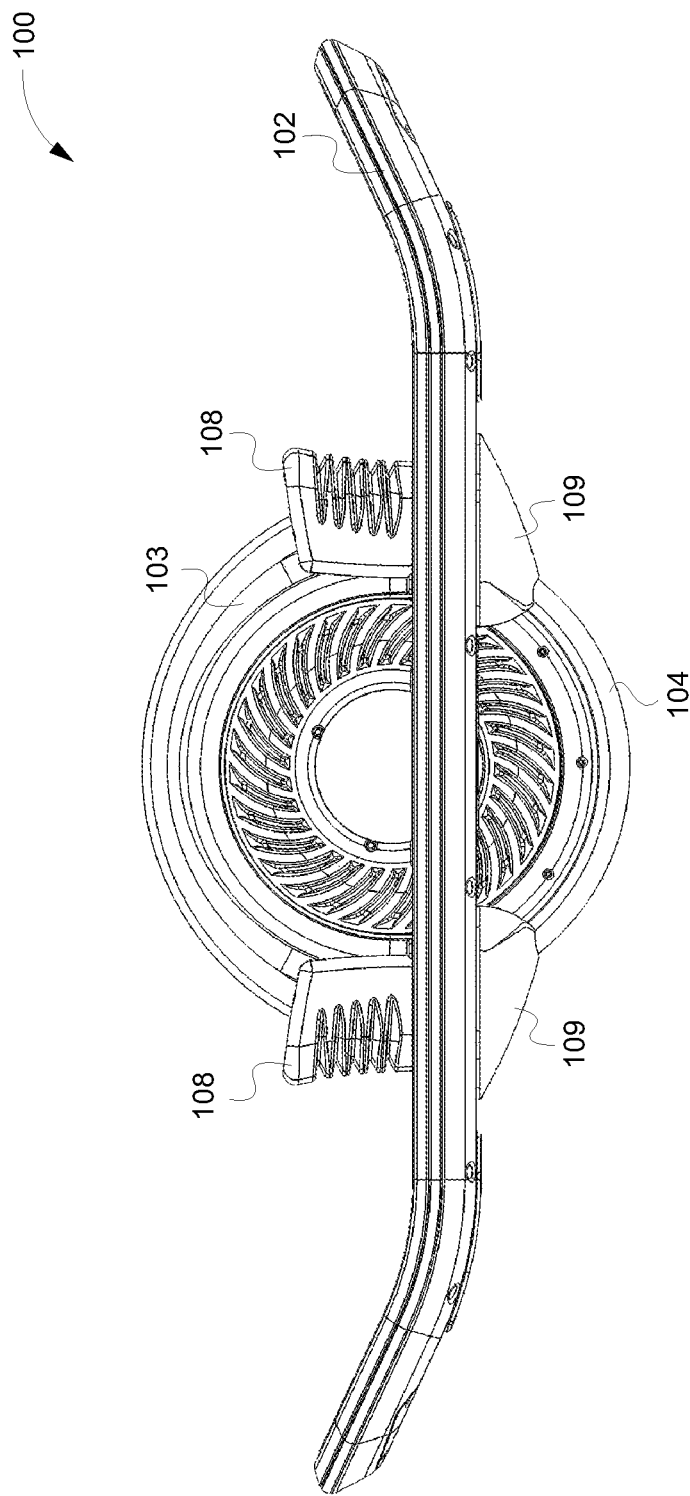
FIG. 1A illustrates a side view of a pitch propelled vehicle according to some embodiments.

Embodiments of a system, device and method of a pitch-propelled vehicle including a board for supporting the user, a ground-contacting member coupled with the board, a motorized drive assembly coupled with the ground-contacting member and one or more sensors coupled with the drive assembly. In operation, the drive assembly adjusts the velocity of the ground-contacting member based on one or more distances of the board from a surface below the board as detected by the sensors. As a result, the vehicle provides the advantage of altering the pitch/velocity relationship when traveling uphill, downhill or on uneven surfaces that make a pitch/velocity relationship with respect to gravity untenable. As used herein the term "ground" is able to be the earth, the floor or any other surface over which the vehicle 100 is able to travel.

FIGS. 1A-1E illustrate a pitch-propelled vehicle 100 according to some embodiments. As shown in FIGS. 1A-1E, the vehicle 100 comprises a platform or board 102, a guard 103, a ground-contacting member 104, a drive assembly 106(a-g), one or more grips 108 and one or more scrapers 109 all operatively coupled together. Alternatively, one or more of the above components are able to be omitted. The board 102 is able to be rigid and detachably coupled to the ground-contacting member 104 such that when balanced the ground-contacting member 104 is able to hold/support the board 102 and the board 102 is able to support the rider(s) above the ground. In some embodiments, the board 102 comprises a member fastener assembly 105 that detachably couples the ground-contacting member 104 and/or some or all of the drive assembly 106(a-g) to the board 102. As a result, the ground-contacting member 104 is able to be selectively separated from or coupled to the board 102 by unlocking or locking the member fastener 105. This locking/unlocking mechanism of the member fastener 105 is able to be a key lock, a snap-fit connection, screw on/off or other types of fasteners that are able to hold the ground-contacting member 104 and/or some or all of the drive assembly 106(a-g) in a locked position with respect to the board 102. Thus, the vehicle 100 provides the advantage of easily replacing or repairing the board 102 and/or the ground-contacting member 104 using the member fastener 105.

As shown in FIG. 1A, the guard 103 shields a rider from the top of the ground-contacting member 104 as it protrudes through the board 102. This provides the advantage of preventing a rider from being injured by stepping on or otherwise contacting the ground-contacting member 104. Although as shown, the guard 103 covers a portion of the sides of the ground-contacting member 104 as it protrudes through the top of the board 102, it is understood that more or less (e.g. all) of the ground-contacting member 104 is able to be shielded by the guard 103. As shown in FIG. 1A, two scrapers 109 are positioned on either side of the ground-contacting member 104 such that the scrapers 109 are adjacent to and/or surround lower ends of the member 104. As a result, the scrapers 109 are able to protect the vehicle 100 from debris such as rocks from entering the vehicle 100 between the ground-contacting member 104 and the board 102. In particular, the scrapers 109 are able to be sized to fill any gap between the ground-contacting member 104 and the underside of the board 102 and/or be positioned as close as possible to the ground-contacting member 104 to block debris from entering the vehicle 100 through such a gap. Further, it is contemplated that the guard 103 and/or grips 108 are able to be similarly positioned on the top of the board 102 to block debris from entering the vehicle 100 through a gap between the board 102 and the ground-contacting member 104 on the top side of the board 102. Additionally, it is contemplated that more or less than two scrapers 109 are able to be used.

Figure 1B:
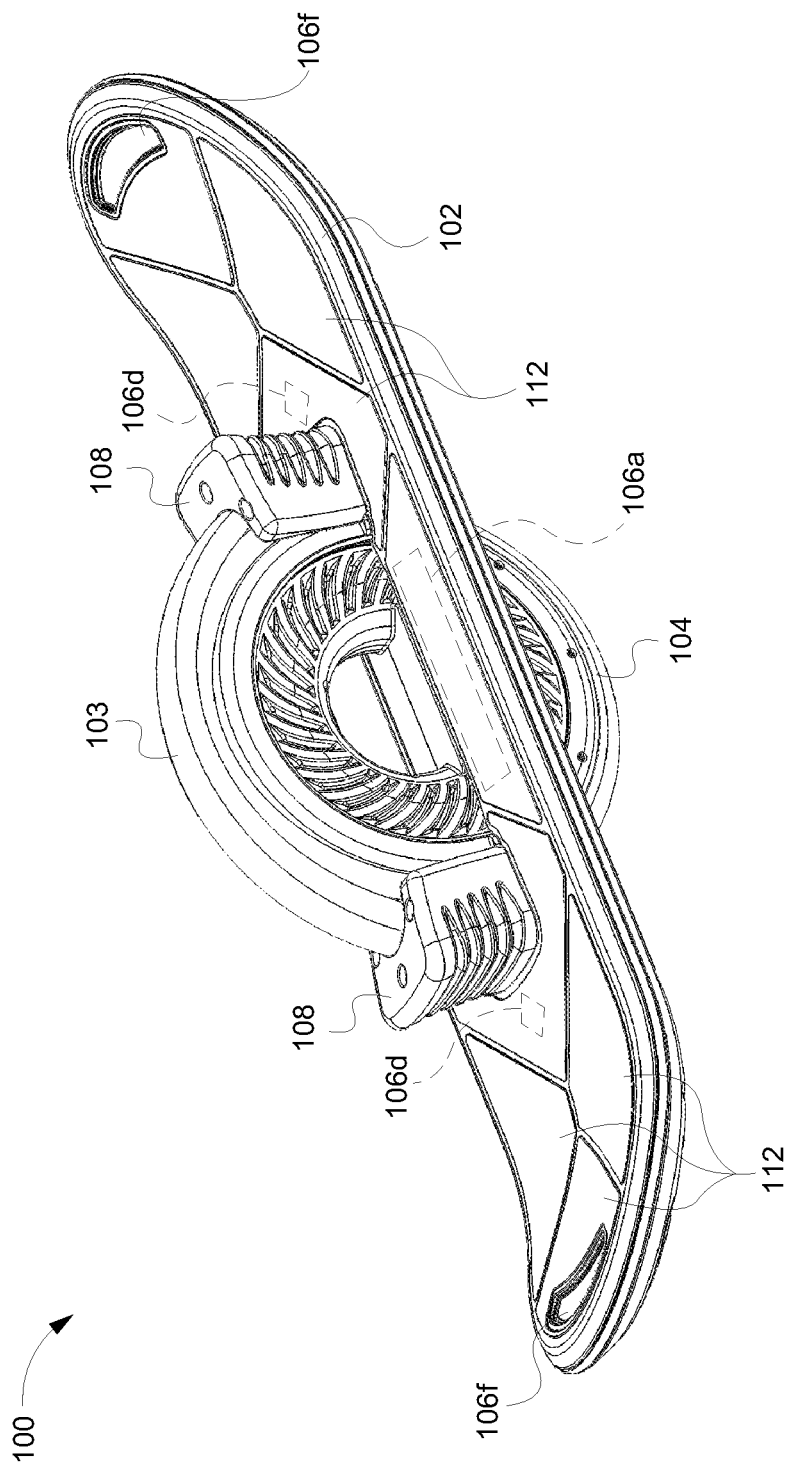
FIG. 1B illustrates a top perspective view of a pitch propelled vehicle according to some embodiments.

The board 102 is able to have a thickness and broad and/or substantially flat top/bottom surface for receiving/supporting the feet of a rider. In some embodiments, the board 102 is able to have an oblong top surface with an elongated dimension in a fore/aft direction similar to the board of a skateboard. In particular, this elongated dimension is able to substantially align with the orientation of the ground-contacting member 104 such that a rider is able to ride the board 102 sideways to the direction of travel like one would ride a skateboard. Alternatively, the top surface of the board 102 is able to be substantially circular, ovular, rectangular, square or otherwise shaped. As shown in FIGS. 1A-1E, the board 102 is able to angle upwards at the fore and aft ends in order to provide better control to a rider and to prevent the feet of the rider from sliding off the board 102. Alternatively, the board 102 is able to be flat or bend downwards or upwards at one or both of the ends at the same or different angles. In some embodiments, the board 102 is at least partially hollow such that the board 102 is able to house and protect some or all of the drive assembly 106, the grips 108 and/or the ground-contacting member 104. Alternatively, the board 102 is able to be solid. As shown in FIGS. 1B and 1D, the board 102 is able to have a textured surface 112 and/or include textured pads 112 coupled to the top surface of the board 102 in order to improve traction between the feet of the rider and the surface of the board 102.

As shown in FIGS. 1A-1E, the vehicle 100 comprises two grips 108 positioned adjacent to the member fastener 105 on the fore and aft ends of the board 102. Alternatively, any number of grips 108 are able to be used and positioned on any portion of the board 102. For example, the board 102 is able to have multiple coupling locations configured to releasably couple to one or more grips 108 such that a user is able to select an ideal location and number of grips to releasably attach to the board 102. Alternatively or in addition, the coupling locations are able to be adjustable such that for each coupling location (and/or grip 108) a user is able to adjust the position of the grip from a range of positions enabled by the coupling location. Thus, the board 102 and grips 108 provide the advantage of enabling a user to adjust the width, orientation, number and/or other characteristics of the grips 108 in order to best grip the vehicle 100 with their feet. In the same manner, one or more of the grips 108 are able to be replaced on the board 102 with grips 108 of different sizes, colors, shapes and other characteristics as desired. In some embodiments, as shown in FIGS. 1A-1E, one or more of the grips 108 are able to be wholly or partially textured in order to increase the ability of a user to hold onto the grips 108 with their feet. Alternatively, the grips 108 are able to be omitted.

As shown in FIGS. 1A-1E, the ground-contacting member 104 is able to comprise a single wheel. In some embodiments, the ground-contacting member is able to be a wheel or wheels that have a small width such as 1.5 inches or less, or ⅕th the width of the board 102 or less, which enables the vehicle 100 to more easily be turned by tilting the board 102 and the wheel 104 to the left or the right side. Additionally, because the member 104 is detachably coupled to the board 102 as described above, members 104 having different widths and/or other dimensions are able to be interchanged as desired to adjust the characteristics of the balance and turning of the ground-contacting member 104 and thereby the vehicle 100. Alternatively, the ground-contacting member 104 is able to comprise, individually or in combination, wheels, balls, arcuate sections of a wheel or ball, clusters of wheels, tracks, treads or other types of ground-contacting members well known in the art. Further, although only a single ground-contacting member 104 is shown, a plurality of ground-contacting members 104 are contemplated. In some embodiments, the ground-contacting member 104 is able to comprise a plurality of grooves for operable coupling to the drive assembly 106 in order to be rotated and/or otherwise driven by the drive assembly 106. In such embodiments, the member 104 is able to be off-center with respect to the board 102, which enables the board 102 to be closer to the ground when supported above the ground by the member 104. Alternatively or in addition, other power transfer mechanisms are able to be used such as an axle wherein the board 102 is centered about the axle and/or other mechanisms well known in the art.

Figure 1C:
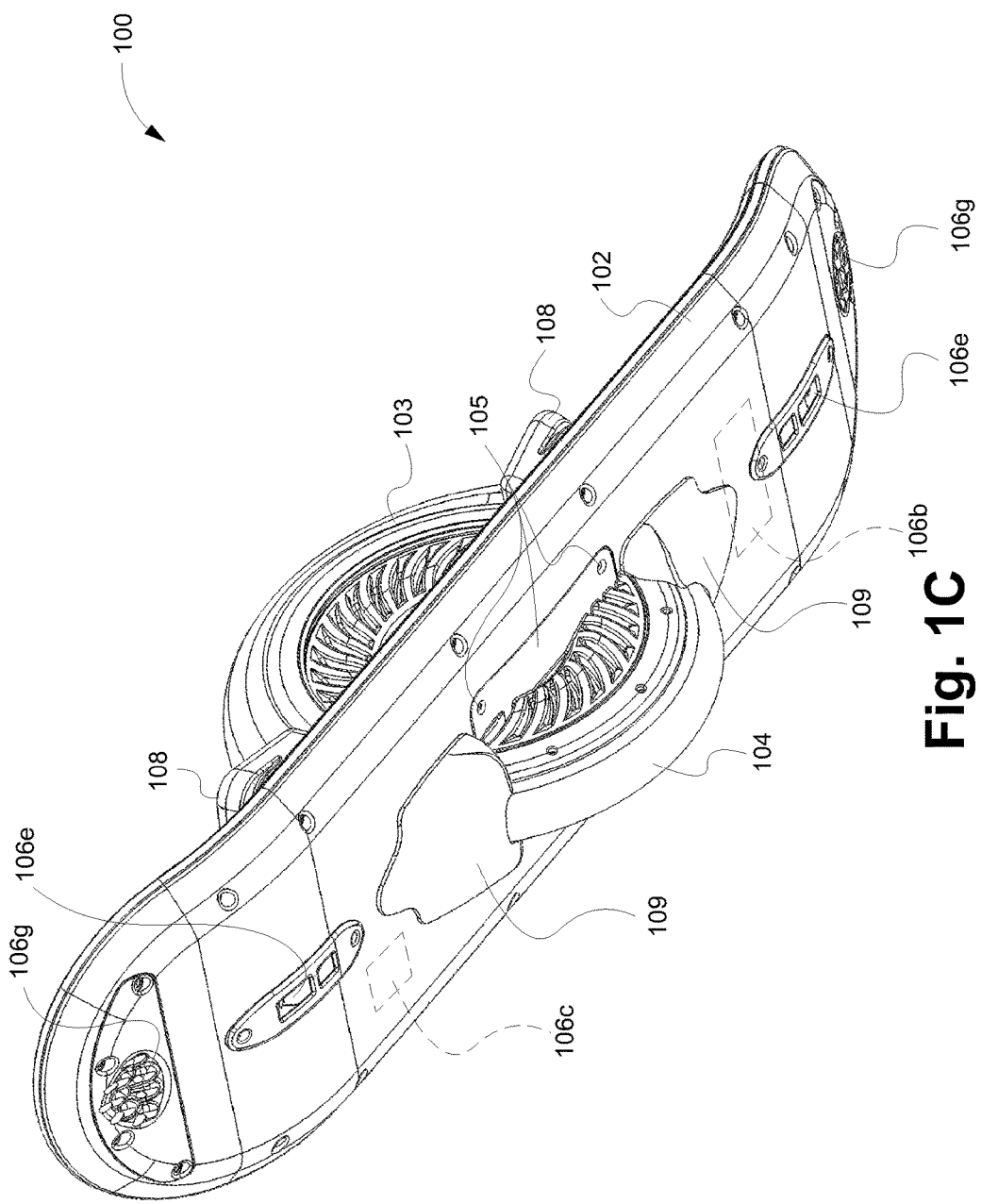
FIG. 1C illustrates a bottom perspective view of a pitch propelled vehicle according to some embodiments.
Figure 1D:
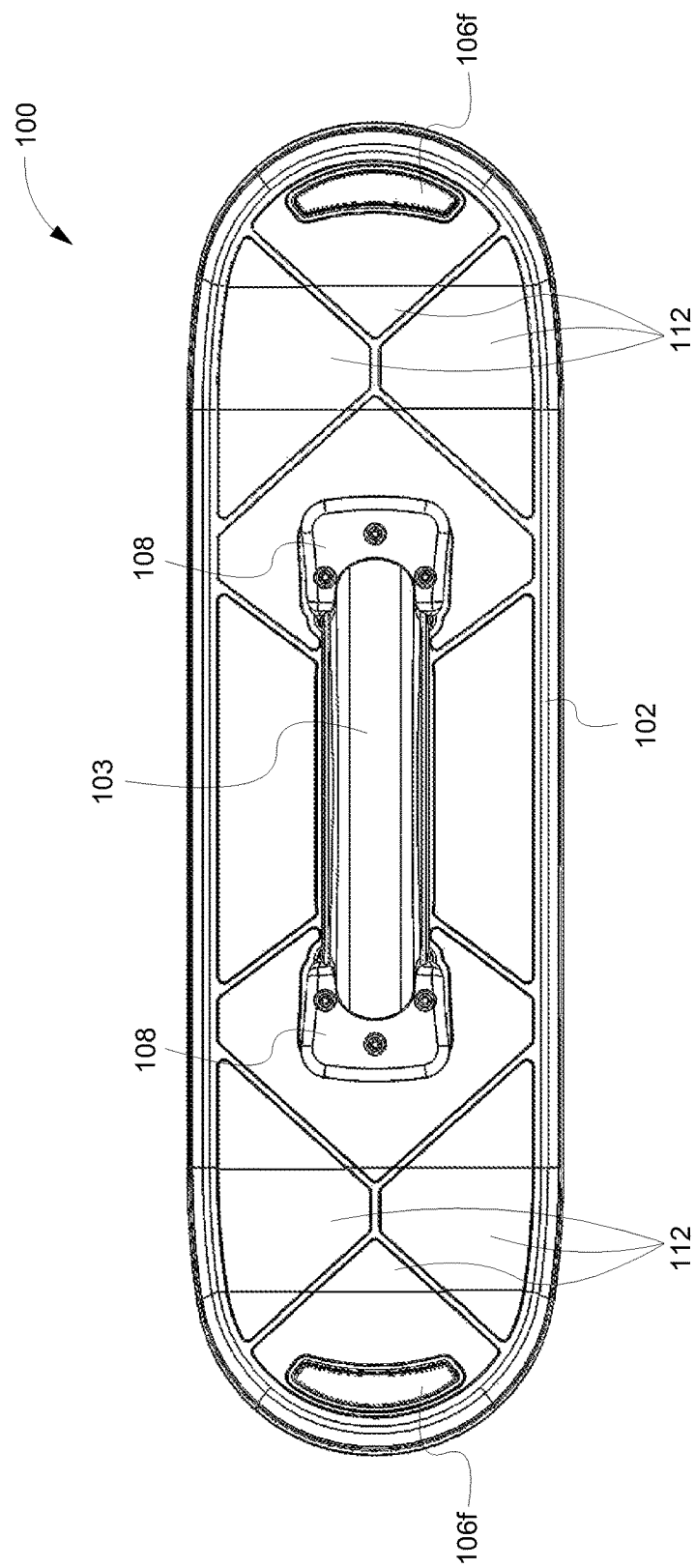
FIG. 1D illustrates a top view of a pitch propelled vehicle according to some embodiments.
Figure 1E:
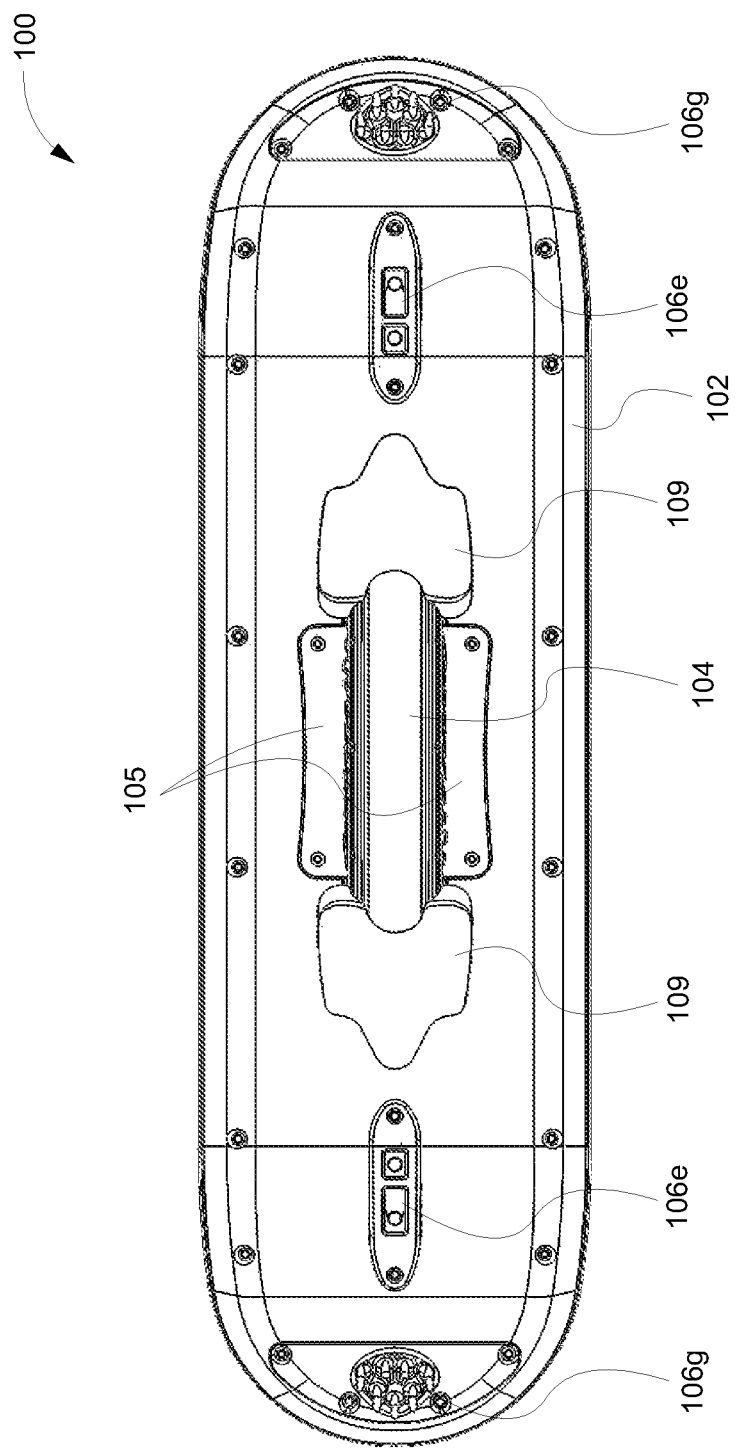
FIG. 1E illustrates a bottom view of a pitch propelled vehicle according to some embodiments.

As shown in FIGS. 1A-1E, the drive assembly 106 comprises one or more motors 106a, batteries 106b, controllers 106c, rider sensors 106d, ground sensors 106e and/or user displays 106f, safety elements 106g all operably coupled together in order to operate the vehicle 100. Alternatively, the drive assembly 106 is able to comprise more or less components and/or more or less quantities of each component. Although shown in particular positions within FIGS. 1A-1E, it is understood that one or more of the components of the drive assembly 106 are able to be positioned anywhere on or within the board 102. For example, in some embodiments only a single user display 106f is able to be used or the user displays 106f are able to be omitted. The drive assembly 106 is housed by the board 102. As a result, the board 102 is able to protect the drive assembly 106 from damage. Alternatively, one or more components of the drive assembly 106 are able to be fully or partially exposed. Although as shown in FIGS. 1C and 1E the vehicle 100 comprises a finite number of motors 106a, batteries 106b, controllers 106c, rider sensors 106d, ground sensors 106e, user displays 106f and/or safety elements 106g, it is understood that more or less of each are contemplated including the omission of one or more of the components.

The one or more motors 106a are operably and/or mechanically coupled to the ground-contacting member 104 in order to cause the ground-contacting member 104 to rotate and thereby stabilize and move the vehicle 100. In some embodiments, the motors 106a are able to engage or couple with the plurality of grooves within the ground-contacting member 104 in order to translate motion/power of the motors 106a to the ground-contacting member 104. For example, one or more of the motors 106a are able to be electric and/or direct drive motors (e.g. motors with a direct drive mechanism that couples to the member without any reductions such as a gearbox) that directly mechanically couple with the grooves of the member 104 in order to cause the member 104 to rotate/actuate as controlled by the controllers 106c. As a result, in such embodiments the vehicle 100 is able to provide the advantages of increased efficiency due to no intermediary power loss, reduced noise and longer lifetime due to less/simpler parts, high torque at lower revolutions per minute and faster/precise positioning by eliminating mechanical backlash, hysteresis and elasticity. Alternatively, one or more of the motors 106a are able to be non-direct drive and/or electric motors such as combustion, hydraulic or other types of direct or indirect drive motors.

The one or more batteries 106b are able to be coupled with and provide power to the motors 106a, controllers 106c, rider sensors 106d, ground sensors 106e, user displays 106f and/or safety elements 106g. In some embodiments, the batteries 106b are able to be rechargeable batteries that provide electrical power to the vehicle 100. In such embodiments, the vehicle 100 is able to comprise a port or plug from receiving electrical power from an outside source such as a power outlet. Alternatively in such embodiments, the vehicle 100 is able to comprise one or more solar arrays that are able to recharge the one or more batteries 106a. Alternatively, the batteries are able to be non-rechargeable such that they must be replaced periodically. In some embodiments, the batteries 106b are able to be positioned across from the motors 106a within the board 102 such that they balance the weight of the motors 106a within the board 102 about the ground-contacting element 104. Alternatively, the batteries 106b are able to be positioned anywhere on or within the board 102.

The rider sensors 106d are able to be coupled to the ground-contacting member 104 and/or the board 102 such that the sensors 106d are able to sense when a user (or payload) is on the board 102. For example, one or more of the rider sensors 106d are able to be positioned on the top surface of the board 102 in order to sense when the feet of a rider or other payload is on the surface of the board 102. Alternatively, the rider sensors 106d are able to be positioned at other points on the vehicle 100. For example, one or more of the rider sensors 106d are able to be positioned at the coupling point (e.g. the member fastener 105) between the board 102 and the ground-contacting member 104 in order to measure the force applied to ground-contacting member 104 via the board 102 due to the weight of a user on the board 102. In some embodiments, the rider sensors 106d are able to comprise resistance sensors, force sensors, acoustic sensors, visual sensors, capacitive sensors or other types of sensors as are well known in the art. The force sensors are able to measure weight or the force at a point on the board 102 and/or the ground-contacting member 104, wherein a user or payload is determined to be present when the force measures exceeds a predefined threshold. The acoustic sensors (e.g. sonar) are able to output an acoustic signal and based on any echo of the signal input by the sensors determine whether a user or payload is on the board 102. Similarly, the visual sensors (e.g. infrared) are able to output a visual signal (or simply utilize external visual signals) and determine if a user or payload is on the board 102 based on measured input light signals. Also, the capacitive sensors are able to detect a change in capacitance between the elements coupled to the board 102, wherein a user or payload is determined to be present when the capacitance between the elements is increased above a predefined threshold.

The ground sensors 106e are operatively (e.g. electrically) coupled with the controllers 106c in order to transmit signals to the controllers 106c based on their input. As shown in FIGS. 1C and 1E, the ground sensors 106 are able to be partially housed within and positioned on the bottom of the board 102 on either end (fore and aft) of the ground-contacting member 104. As a result, the ground sensors 106e are able to measure the distance between the board 102 and the ground on both ends of the board 102. Therefore, as described below with reference to the controllers 106c, based on these measured distances (and the preset distances of the sensors 106e from the ground-contacting member 104) the controllers 106c are able to determine the pitch of the board 102 relative to the ground. Alternatively, ground sensors 106e are able to be positioned on other portions of the board 102. In some embodiments, the ground sensors 106e are only positioned on a single end (fore or aft) of the board 102.

The ground sensors 106e are able to be acoustic sensor (e.g. sonar based sensors) that output an acoustic signal and then determine a distance between the sensor and the ground or another object based on the echo or reflection of the acoustic signal as received by the sensor 106e. Alternatively, the ground sensors 106e are able to be light sensors that, for example, output a light signal (e.g. infrared) and then determine a distance between the sensor and the ground or another object based on the reflection of the light signal as received by the sensor 106e. Alternatively, the ground sensors 106e are able to comprise acoustic sensors, light sensors, radio frequency sensors, force sensors, pressure sensors or a combination thereof.

The user displays 106f are operatively (e.g. electrically) coupled with the controllers 106c in order to receive display commands from the controllers 106f. As a result, the user displays 106f are able to display information to the user about the vehicle 100 based on data received from the controllers 106c. For example, the displays 106f are able to display a charge level of the batteries 106b, a current speed of the vehicle 100, revolutions per minute of the ground-contacting member 104, a pitch level and direction of the board 102, a warning or repair message if the vehicle is in an unsafe or damaged condition, a current time and/or other types of information as are well known in the art. As shown in FIGS. 1B and 1D, the displays 106f are positioned at the fore and aft ends of the board 102. Alternatively, the displays 106f are able to be positioned on other portions of the board 102.

The safety elements 106g are able to comprise lights and/or speakers that output light and/or sound from the vehicle 100. For example, the safety elements 106g are able to comprise lights that light an area around the vehicle 100 such as the front path of the vehicle 100 like headlights on a car and/or the back of the vehicle 100 like tail lights on a car. In some embodiments, the safety element 106g closest to the direction of travel displays a white light to illuminate the upcoming road/surface. In some embodiments, the safety element 106g closest to the rear of the direction of travel displays a red light to indicate the back of the vehicle 100 and/or is able to be controlled by the controller 106c to light up when the vehicle 100 is decelerating/braking like car tail lights. In some embodiments, the color and/or operation of the safety elements 106g are able to switch based on the direction of travel of the vehicle 100. For example, a safety element 106g acting as a tail light is able to switch operation to act as a head light and vice versa when direction of the vehicle 100 is reversed. In some embodiments, the safety elements 106g are configured to sense ambient light and only activate when ambient light detected is less than a threshold level. Alternatively or in addition, the safety elements 106g are able to be activated or de-activated manually.

In some embodiments, the safety elements 106g are able to output a warning noise that warns people that the vehicle 100 is near. In some embodiments, the noise is able to change in tune, frequency or otherwise based on the acceleration, deceleration or other operations of the vehicle 100. In some embodiments, the safety elements 106g are able to couple with an audio source via the controller or separately such that they are able to produce audio based on the signal received from the audio source. For example, the safety elements 106g are able to play music from a radio or antenna and/or from another audio source device (e.g. telephone, ipod). The safety elements 106g are operatively (e.g. electrically) coupled with the controllers 106c in order to receive commands from the controllers 106f. As a result, the user displays 106f are able to operate based on data received from the controllers 106c. As shown in FIGS. 1B and 1D, the safety elements 106g are positioned at the fore and aft ends of the board 102. Alternatively, the safety elements 106g are able to be positioned on other portions of the board 102.

Figure 2:
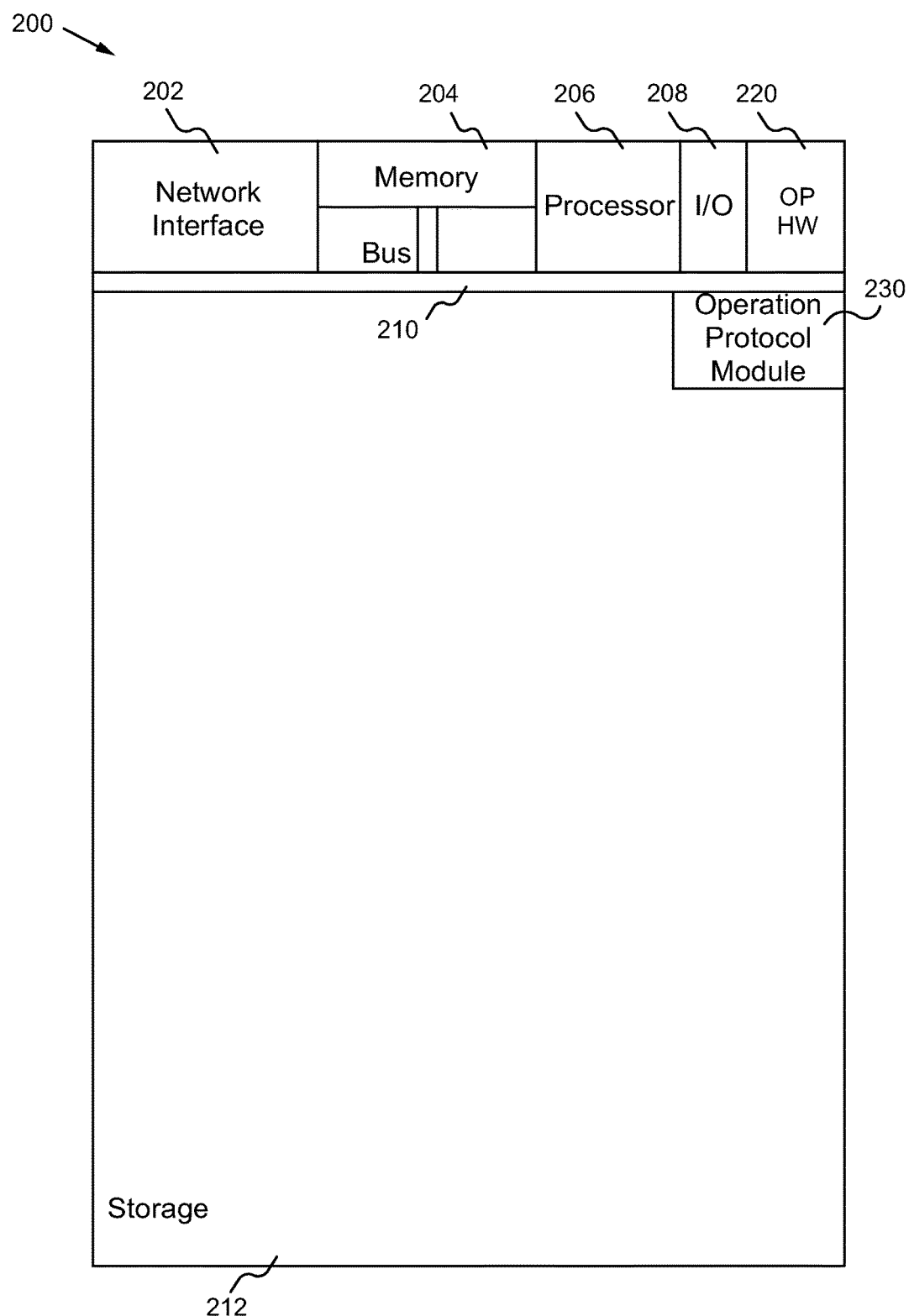
FIG. 2 illustrates a block diagram of an exemplary controller according to some embodiments.

The controllers 106c are operably coupled to the motors 106a, the rider sensors 106d, the ground sensors 106e, the user displays 106f and/or safety elements 106g in order to control their operation according to a predefined operation protocol module as described below. In some embodiments, the controllers 106c and one or more other components of the vehicle 100 are able to be coupled together by a controller area network (CAN) bus. Alternatively, other networks are able to be used. FIG. 2 illustrates a block diagram of an exemplary controller 106c according to some embodiments. As shown in FIG. 2, the controller 106c comprises a network interface 202, a memory 204, a processor 206, I/O device(s) 208, a bus 210 and a storage device 212. Alternatively, one or more of the illustrated components are able to be removed or substituted for other components well known in the art. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, flash memory card or any other storage device. The controller 106c is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. The operation protocol 230 used to operate the vehicle 100 is able to be stored in the storage device 212 and memory 204 and processed as programs are typically processed. More or less components shown in FIG. 2 are able to be included in the controller 106c. In some embodiments, operation protocol hardware 220 is included, wherein the hardware implements a portion or all of the operation protocol. Although as shown in FIG. 2, the controller 106c includes software 230 and hardware 220 for implementing the operational protocol, the operation protocol is able to be implemented in hardware, firmware, software or any combination thereof. Additionally, the controller 106c is able to comprise one or more components not shown in FIG. 2 that enable the controller 106c to perform commutation and other calculations. For example, the controller 106c is able to comprise an encoder for encoding the position of the ground-contacting member 104 relative to the board 102 or another static marker. These components are well known in the art and not described herein for the sake of brevity.

In operation, when implementing the operation protocol, the controller 106c determines the distance between one or both the fore and aft ends of the board 102 and the ground (or surface below the board 102) based on the input from one or more of the ground sensors 106e. Subsequently, based on the determined distance(s), the controller 106c calculates a pitch of the board 102 relative the ground and causes the motors 106a to apply a force to the ground-contacting member 104 based on the determined board pitch. For example, if the controller 106c determines that the board 102 is pitched at a first level, the controller 106c causes the ground-contacting member 104 (via the motors 106a) to slow down, speed up and/or reverse direction in order to approach and eventually match a desired velocity, acceleration and/or torque associated with the pitch of the first level. As a result, in general, when a user leans to pitch the board 102 in the aft or fore directions relative to the ground, the controller 106c will cause the ground-contacting member 104 and thus the vehicle 100 to move (or reverse direction and then move) in the aft or fore directions, respectively. As a result, the vehicle 100 provides the advantage of compensating for changes in ground level when determining the pitch of the board because the board pitch is determined relative to the ground. This is important when the vehicle 100 is traversing uneven surfaces as they can limit the ability of the board to pitch. For example, in systems where pitch is based on a deviation of the board angle with respect to gravity, when going up hill it can become difficult or impossible to keep the board pitched forward because the hill/ground blocks further pitching. In contrast, the pitch-propelled vehicle 100 described herein is able to determine the pitch relative to the hill/ground such that less forward pitch is still able to cause the vehicle 100 to move forward at the desired rate.

In some embodiments, the board pitch is dynamically determined based on an average of the current distance detected between the fore end of the board 102 and the surface and the current distance detected between the aft end of the board 102 and the surface as detected by one or more of the ground sensors 106e. Alternatively, the board pitch is able to be dynamically determined by the distance detected between only one end of the board 102 and the surface. Alternatively, the board pitch is able to be dynamically determined based on the difference between the current distance detected between the fore end of the board 102 and the surface and the current distance detected between the aft end of the board 102 and the surface.

In some embodiments, the controller 106c takes into consideration detected changes the in surface that are about to be traversed by the ground-contacting member 104 when adjusting the force applied to the ground-contacting member 104 in order to achieve the desired velocity, acceleration and/or torque. In particular, because the sensors 106e are a distance in front (and behind) the ground-contacting member 104, they are able to detect (or map) characteristics of and changes in the ground/surface before the ground-contacting member 104 reaches the changes. As a result, the controller 106c is able to adjust the command signals sent to the ground-contacting member 104 based on the characteristics/changes in the ground before the ground-contacting member 104 has encountered the characteristics/changes. In such embodiments, the controller 106c is able to determine a time in the future when the ground-contacting member 104 is expected to reach the characteristics/changes and adjust the timing of the control signals associated with the characteristics/changes to correspond to the determined time. The time is able to be determined based on the current position of the ground-contacting member 104 relative to the characteristics/changes and the velocity, acceleration and/or torque of the ground-contacting member 104.

For example, if the controller 106c detects an upcoming inclination of the surface (based on the current direction of travel, a previously determined distance and the currently determined distance between the surface and one or more of the ground sensors 106e on leading side of the direction of travel), the controller 106c is able to increase the amount of force applied to the ground-contacting member 104 to compensate for the anticipated upcoming inclination. Similarly, the force is able to be decreased to compensate for anticipated upcoming declination. In other words, even if the current detected pitch corresponds to a first force level, a higher or lower force level is able to be applied in anticipation of the detected or mapped characteristics/changes. As a result, the vehicle 100 provides the advantage of providing predictive control of the ground-contacting member 104 to compensate for incoming obstacles and terrain.

In order to adjust the actuation of the motors 106a (and therefore the ground-contacting member 104), the controller 106c finely encodes (e.g. greater than 1,000 counts per revolution granularity) and monitors the position of the ground-contacting member 104 relative to the board 102. Using this detected current position as feedback, the controller 106c is able to utilize sinusoidal commutation to control the actuation of the motors 106a and thus the force applied to the ground-contacting member 104. This provides the advantage of creating smoother riding experience by eliminating the cogging produced by other commutation method especially at lower speeds. Alternatively, other types of commutation, such as trapezoidal (or "six-step") commutation, are able to be used. In some embodiments, the controller 106c is able to incorporate a control loop feedback mechanism in order to analyze and adjust/compensate the control of the motors 106a based on the feedback (i.e. the detected current position of the ground-contacting member 104). For example, the controller 106c is able to incorporate a closed loop proportional-integral-derivative (PID) control feedback loop that receives the feedback, and based on the feedback transmits one or more error corrections signals that the controller 106c uses to adjust the commutation and/or control of the motors 106a. Alternatively, the PID controller is able to be open loop and/or other types of control loop feedback mechanisms are able to be used as are well known in the art. Alternatively, the controller 106c is able to control operation of the vehicle 100 without feedback.

Further, instead of equating pitch (relative to ground) to a desired torque, the controller 106c is able to be configured to equate pitch (relative to ground) to a desired acceleration. For example, the PID control feedback loop is able to be configured to determine acceleration error compensation instead of torque error compensation. As a result, the PID control feedback loop and the controller 106c provides the advantage of being able to devote greater bandwidth to adjusting for incoming surface changes such as bumps, holes or other inclines/declines. Alternatively, the PID control feedback loop is able to be otherwise configured as desired in order to fine tune the compensation of the control signal as desired. Additionally, in some embodiments, the vehicle 100 is able to comprise one or more gyroscopic and/or acceleration sensors that transmit signals to the controllers 106c such that the controllers 106c are able to smooth or otherwise further process information received from the ground sensors 106e.

Figure 3:
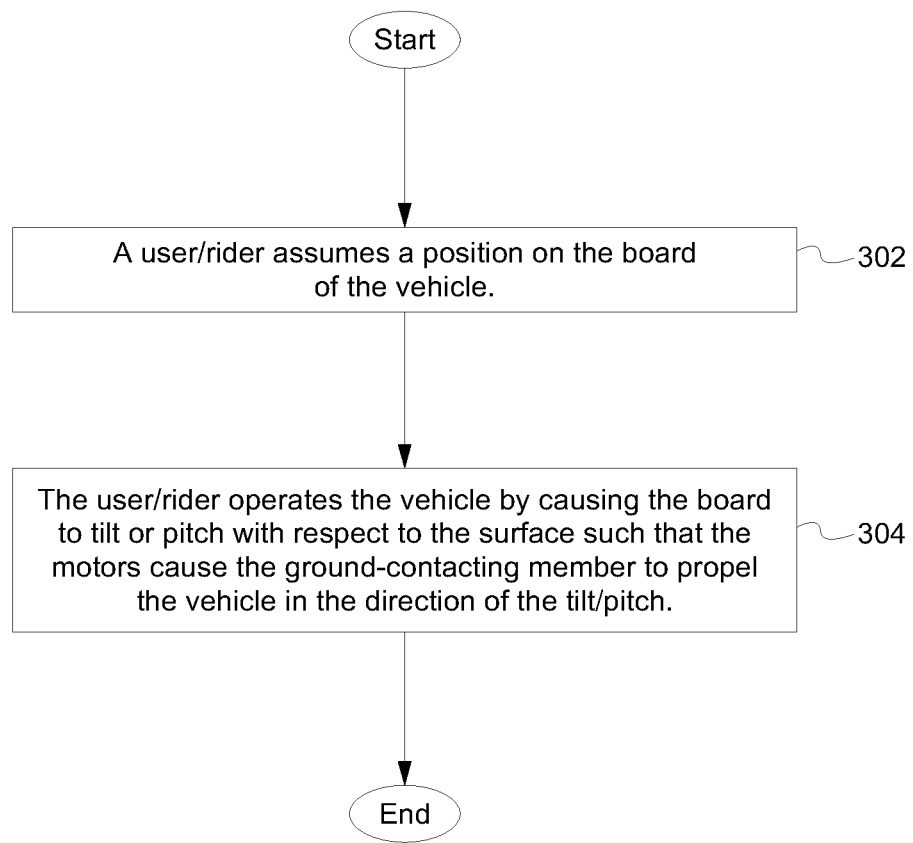
FIG. 3 illustrates a flow chart of a method of carrying a user according to some embodiments.

FIG. 3 illustrates a flow chart of a method of carrying a user according to some embodiments. As shown in FIG. 3, a user/rider assumes a position on the board 102 of the vehicle 100 at the step 302. The user/rider operates the vehicle 100 by causing the board 102 to tilt or pitch with respect to the surface such that the motors 106a cause the ground-contacting member 104 to propel the vehicle in the direction of the tilt/pitch at the step 304. In some embodiments, the user selectively couples or decouples the ground-contacting member 104 from the board 102 via one or more member fasteners 105 coupled to the board 102 by locking or unlocking the fasteners 105. In some embodiments, the user selectively couples or decouples the grips 108 from the board 102 via one or more fasteners coupled to the board 102 by locking or unlocking the fasteners. As a result, the method provides the advantage of compensating the board pitch determination to account for changes in the level of the ground or surface below the board 102.

The pitch propelled vehicle system, device and method described herein has numerous advantages. Specifically, as described above the vehicle provides the advantage of altering the pitch/velocity relationship to correspond to the surface below the board (as detected by e.g. acoustic sensors) when traveling uphill, downhill or on uneven surfaces that make a pitch/velocity relationship with respect to gravity untenable. Further, it provides the advantage of including foot grips that enable a user to jump or lift the board with their feet when approaching a curb or other obstacle. Moreover, it provides the advantage of enabling the ground-contacting member to be selectively released/decoupled from the board/drive assembly and selectively re-coupled or replaced with a different ground-contacting member. Additionally, the vehicle provides the advantage of utilizing a direct drive motor/mechanism that more efficiently transfers power to the ground-contacting member, provides better torque at lower speeds, and conserves battery life. Also, the vehicle provides the advantage of using a thin wheel or other type of ground-contacting member, which enables the vehicle to be more easily turned via tilting the board sideways to the direction of travel.

Figure 4A:
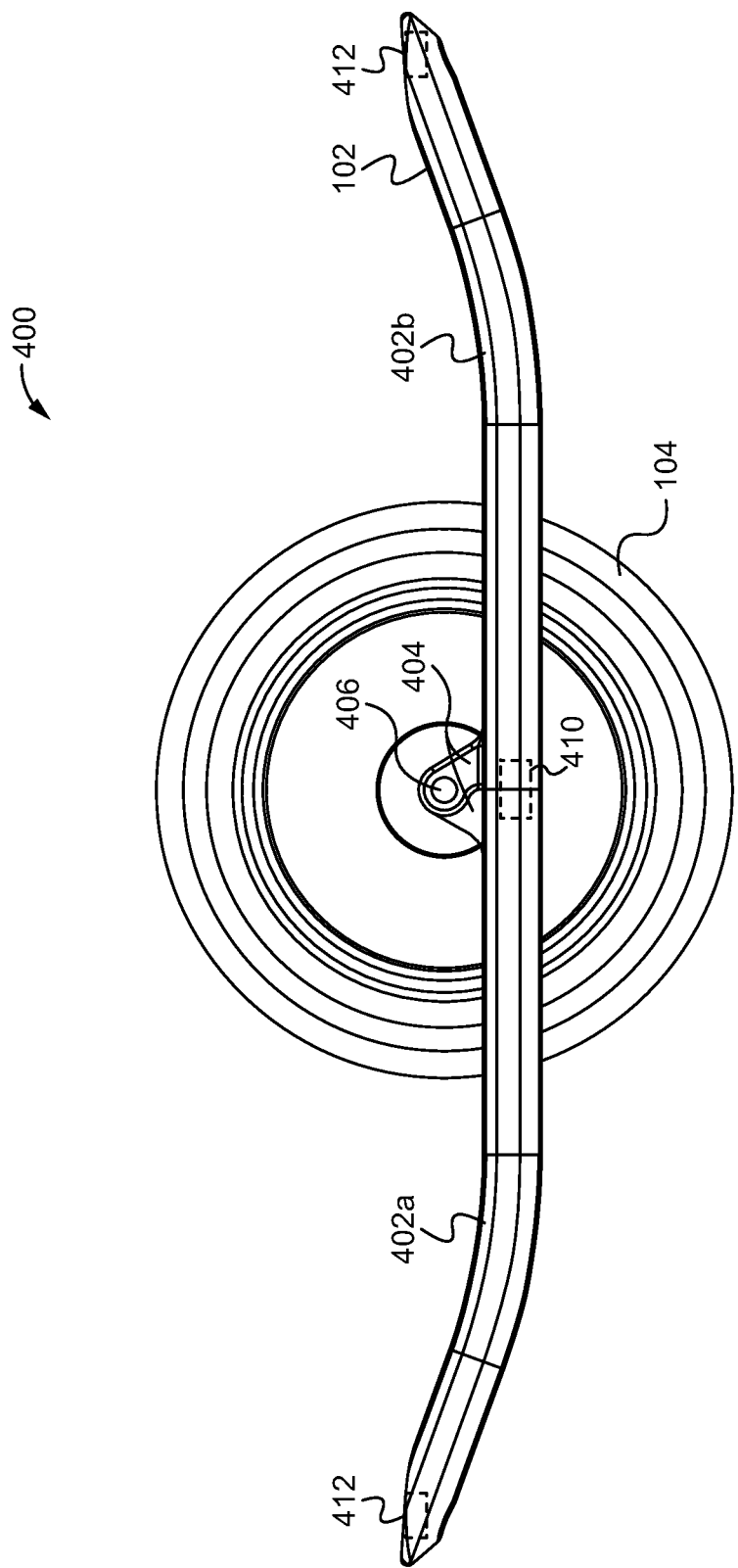
FIG. 4A illustrates an unfolded side view of a pitch propelled vehicle with a folding feature according to some embodiments.
Figure 4B:
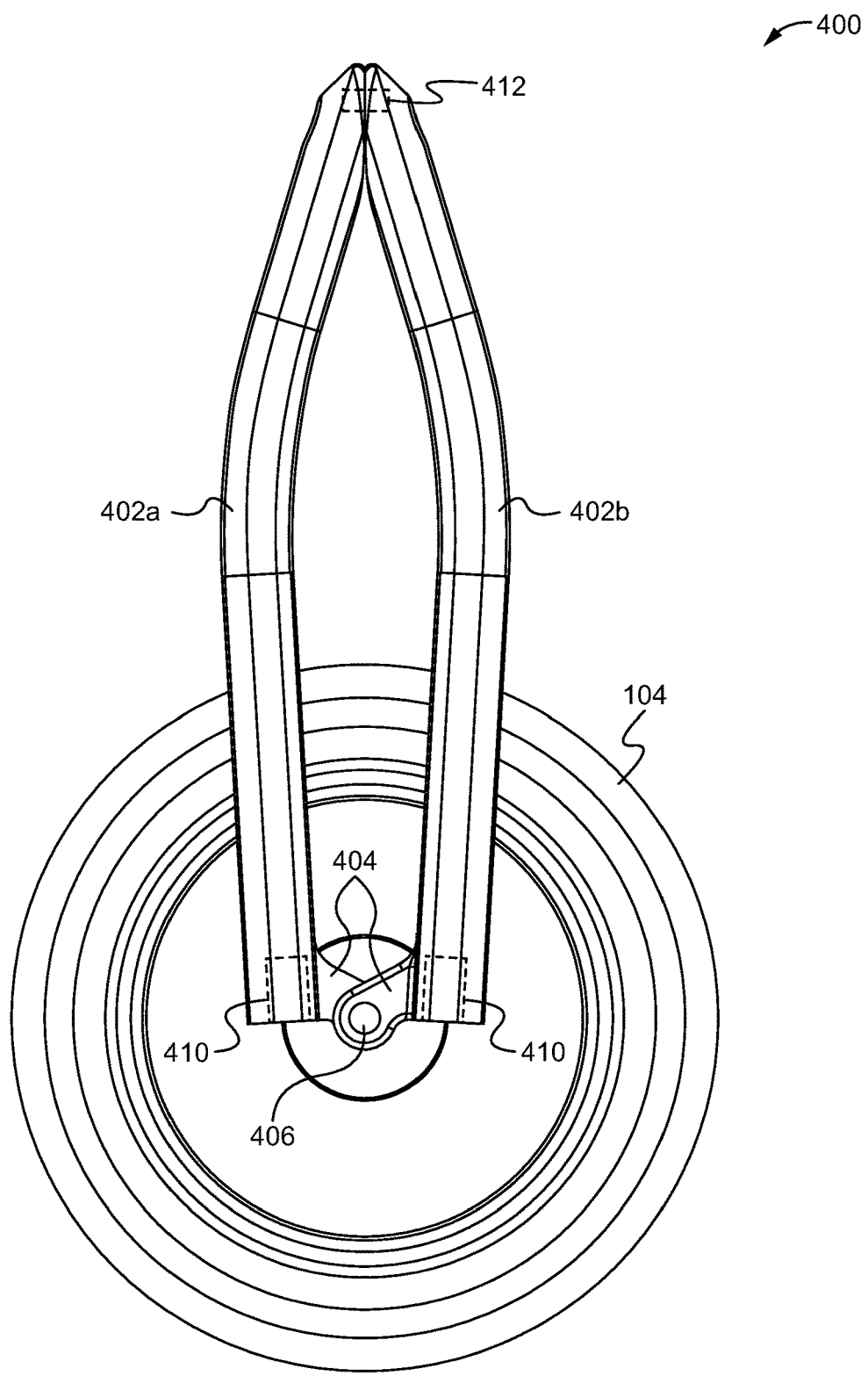
FIG. 4B illustrates a folded side view of a pitch propelled vehicle with a folding feature according to some embodiments.

FIGS. 4A, 4B, 4C and 4D illustrate an unfolded side view, a folded side view, an unfolded isometric view and a folded isometric view, respectively, of a pitch propelled vehicle 400 with a folding feature according to some embodiments. The pitch propelled vehicle 400 shown in FIGS. 4A and 4B is able to be substantially similar to the pitch propelled vehicle 100 described in FIGS. 1A-E except for the differences described herein. In particular, detailed description and/or illustration of the shared features of the vehicles 100 and 400 has been omitted for the sake of brevity. As shown in FIGS. 4A and 4B, the board 102 of the vehicle 400 is separated into two sections 402a, 402b that are pivotably coupled by one or more folding hinges 404 such that the two boards are able to pivot with respect to each other about the axis formed by a pin (or pins) 406 of the hinges 404. In some embodiments, as shown in FIGS. 4A-4D, the pin (or pins) 406 is/are able to be the axle of the wheel 104 (around which the wheel 104 rotates) such that the hinges 404 are coupled to and pivot around the axle when folding and unfolding. Alternatively, one or more of the pins 406 are able to be separate from the axle of the vehicle 400. In such embodiments, the pins 406 (and thus the axis formed by the pins about which the sections rotate) are able to aligned or unaligned with the axle of the vehicle 400. In some embodiments, the hinges 404 are embedded within a cavity of the board 102 (e.g. between the faces of the two sections 402a, 402b that touch each other when the board 102 is in the unfolded position).

Figure 4D:
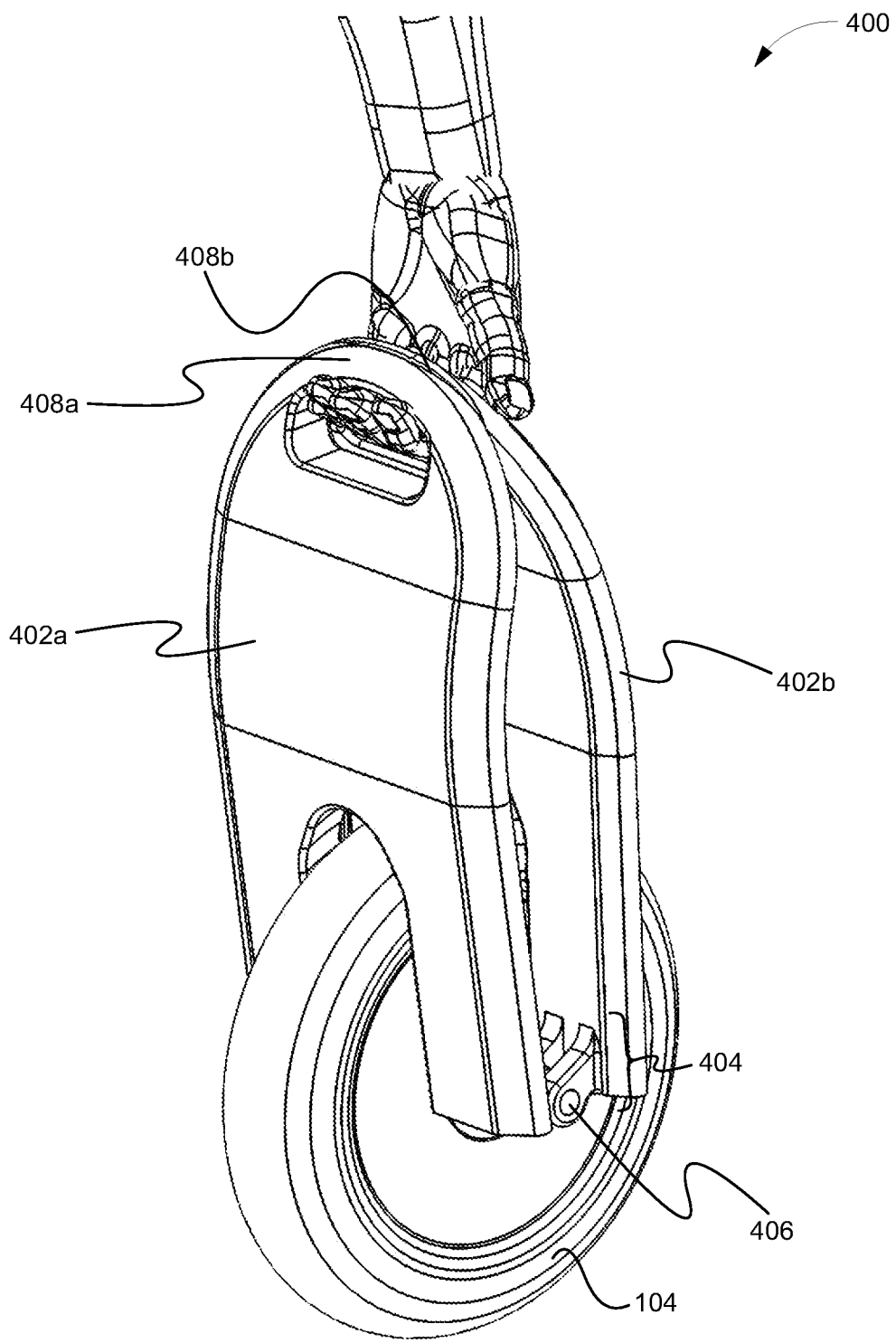
FIG. 4D illustrates a folded isometric view of a pitch propelled vehicle with a folding feature according to some embodiments.

As shown in FIGS. 4C and 4D, the board 102 is able to comprise one or more handles 408a, 408b for making the board 102 easier to hold when folded or unfolded. In some embodiments, one or more of the handles 408a, 408b comprise an aperture or hole that extend all the way through the board 102 such that a user is able to put their hand through the aperture in order to grip the handle 408a, 408b. Alternatively, one or more of the handles 408a, 408b are able to comprise channels or cavities within the board 102 that dig into but do not extend all the way through the board 102. For example, the cavities of the handle or handles 408a, 408b are able to project into the bottom of the board 102 but not extend through to the top of the board 102. In some embodiments, the handles 408a, 408b are positioned on the ends of the board 102 such that when the board 102 is fully folded and the two ends are adjacent, touching and/or abut each other (as shown in FIGS. 4B and 4D), apertures of the handles 408a, 408b are aligned or overlap such that a user is able to put a hand through both of the apertures at the same time. Although as shown in FIGS. 4C and 4D, the board 102 comprises two handles 408a, 408b at the two ends of the board 102, more or less handles 408a, 408b are contemplated positioned in the same or different positions on the board 102.

In some embodiments, the faces or surfaces of the two sections 402a, 402b of the board 102 that touch or abut each other when the board 102 is in the unfolded position (as shown in FIG. 4A) are able to comprise one or more detachably coupling electrical interfaces (not shown) that facilitate operative/electrical coupling of elements of the drive assembly 106 that are located on different sections 402a, 402b. For example, the interfaces are able to electrically, communicatively and/or operatively couple together one or more first elements of the drive assembly 106 on the section 402a to one or more second elements of the drive assembly 106 on the section 402b when the board 102 is in the unfolded position, wherein the first and second elements are uncoupled when the board 102 is in the folded position. In some embodiments, the faces or surfaces of the two sections 402a, 402b of the board 102 that touch or abut each other when the board 102 is in the unfolded position (as shown in FIG. 4A) are able to comprise one or more fasteners 410 that detachably couple the two faces together in the unfolded position. In such embodiments, the fasteners 410 are able to include a locking mechanism that prevents the fasteners from detaching the two faces unless the locking mechanism is unlocked. Similarly, in some embodiments, the ends of the two sections 402a, 402b of the board 100 that touch or abut each other when the board 100 is in the folded position (as shown in FIG. 4B) are able to comprise one or more fasteners 412 that detachably couple the two ends together in the folded position. In such embodiments, the fasteners 412 are able to include a locking mechanism that prevents the fasteners 412 from detaching the two ends unless the locking mechanism is unlocked. Alternatively, one or more of the fasteners 410, one or more of the fasteners 412 and/or one or more of the electrical interfaces are able to be omitted.

Figure 4E:
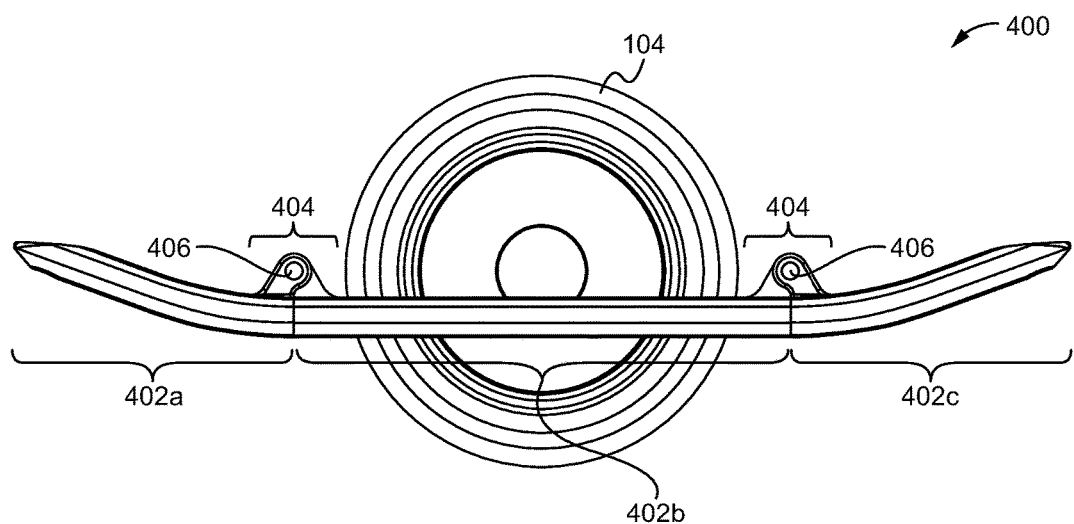
FIG. 4E illustrates an unfolded side view of a pitch propelled vehicle with a folding feature according to some embodiments.
Figure 4F:
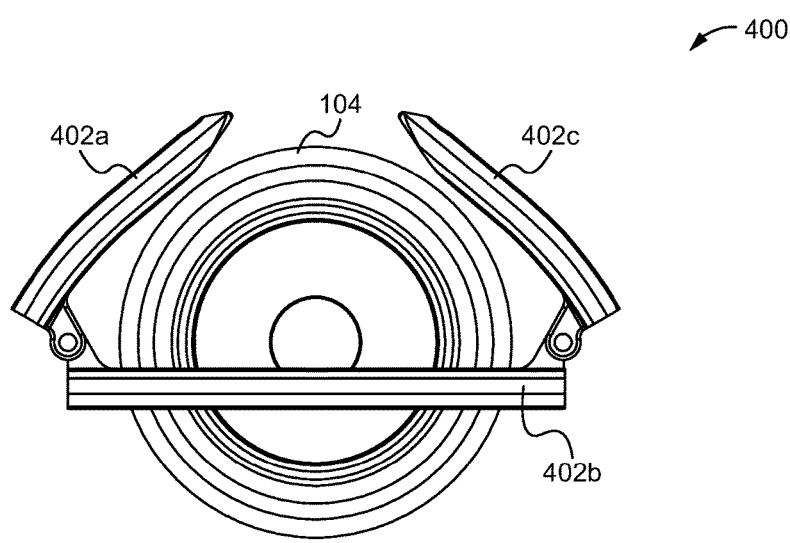
FIG. 4F illustrates a folded side view of a pitch propelled vehicle with a folding feature according to some embodiments.

In some embodiments, if the vehicle 100 comprises a hollow axle around which the wheel 104 rotates (e.g. the hollow axle within the wheel 104 as shown in FIGS. 1A-1E), the pins 406 are able to be coupled to a hollow axle such that the sections 402a, 402b pivot about the pins 406 as coupled to the hollow axle. Alternatively, the hinges 404 are able to be omitted and instead the two sections 402a, 402b are able to slide along the guard 103 (e.g. via a rail or track that slidably couples the sections 402 and the guard 103). In some embodiments, the grips 108 are able to be omitted or are also able to slide along with the sections 402a, 402b such that they do not block the sliding of the sections 402a, 402b. Although, as shown in FIGS. 4A-D, the board 102 comprises one axis (created by two hinges 404) about which two sections 402a, 402b are able to fold/pivot any number of hinges 404 enabling any number of sections 402 to fold/pivot about any number of axis is contemplated. For example, as shown in FIGS. 4E and 4F, in some embodiments the vehicle 400 is able to comprise two sets of hinges 404 are able to enable two axis upon which three sections 402a, 402b, 402c of the board 102 are able to pivot. Additionally, although as shown in FIGS. 4A-D the hinges 404 are positioned such that the pivot axis are perpendicular to the wheel 104 (and the elongated dimension of the board 102), other non-perpendicular angles of the pivot axis are contemplated. Thus, the vehicle 400 provides the benefit of enabling the folding and unfolding of the board 102 in order to save space during storage of the vehicle 400.

Figure 5:
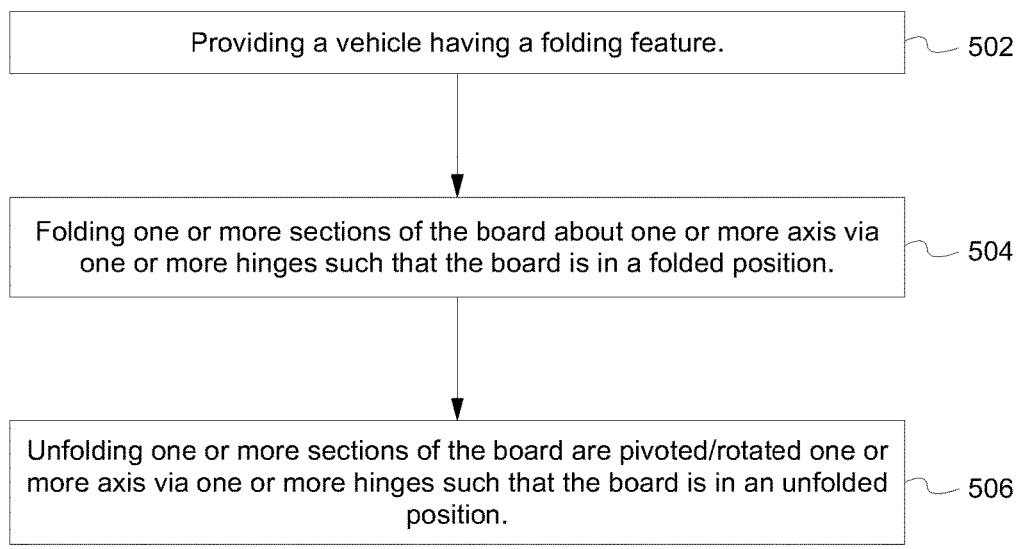
FIG. 5 illustrates a flow chart of a method of using a pitch propelled vehicle with a folding feature according to some embodiments.
Figure 6A:
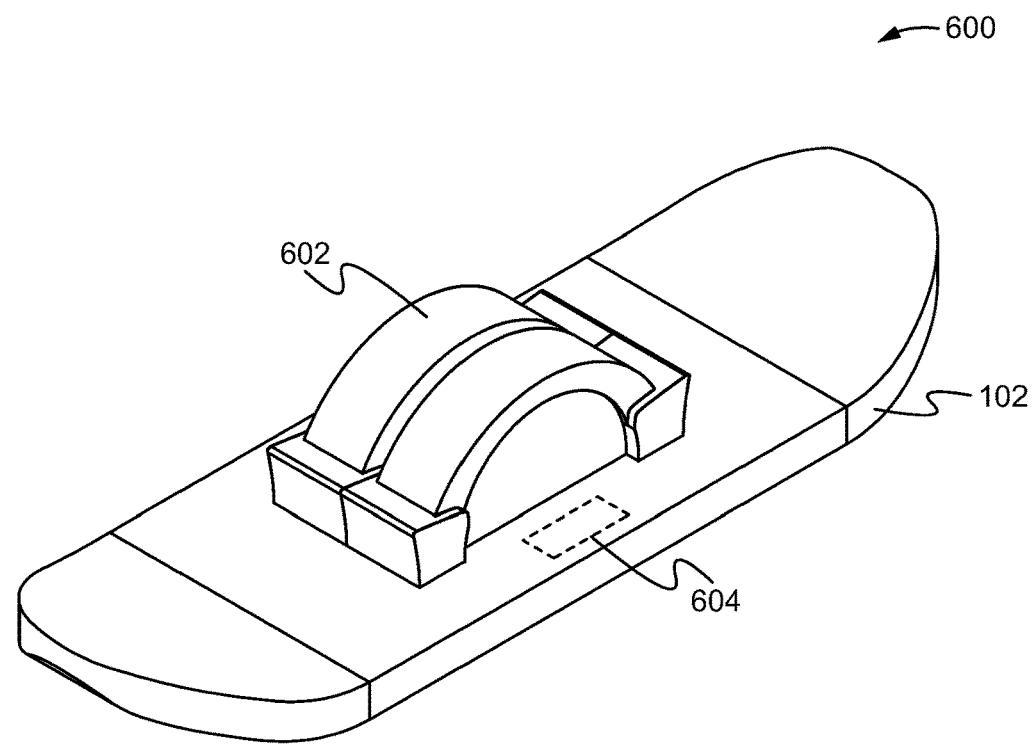
FIG. 6A illustrates a side view of a pitch propelled vehicle with a plurality of side-by-side ground contacting members according to some embodiments.
Figure 6B:
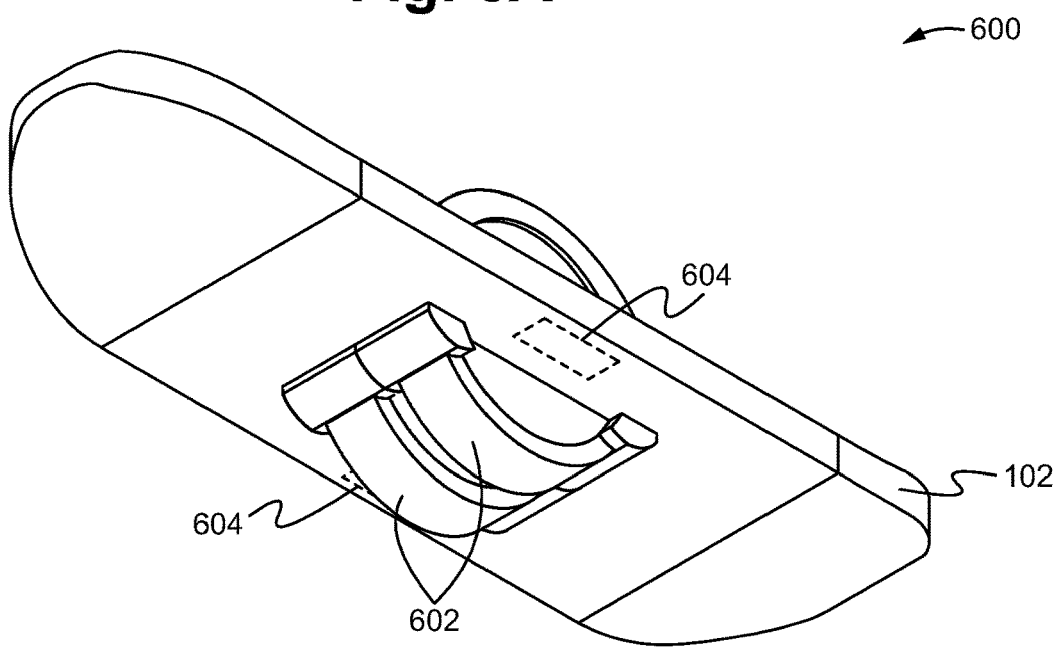
FIG. 6B illustrates a bottom perspective view of a pitch propelled vehicle with a plurality of side-by-side ground contacting members according to some embodiments.
Figure 6C:
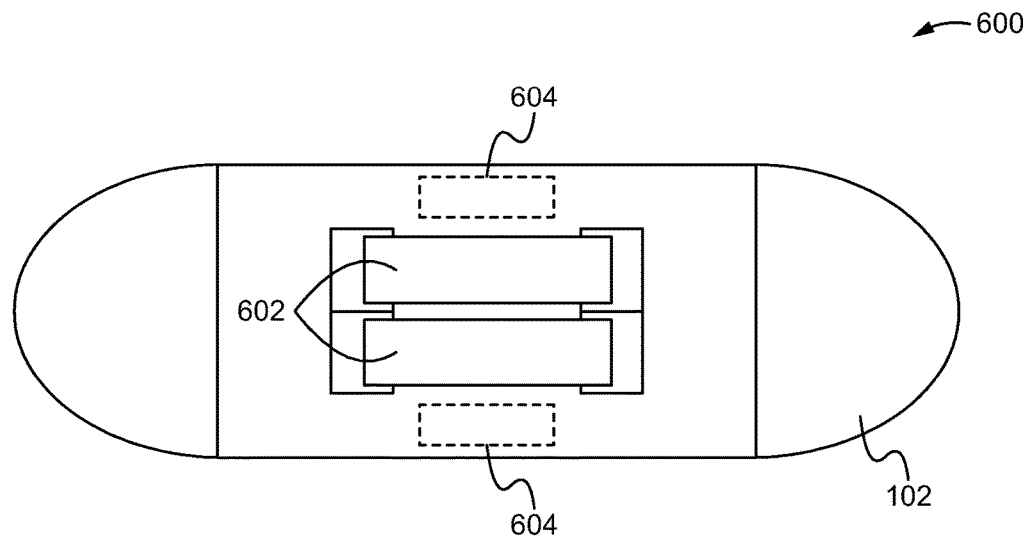
FIG. 6C illustrates a bottom view of a pitch propelled vehicle with a plurality of side-by-side ground contacting members according to some embodiments.
Figure 6D:
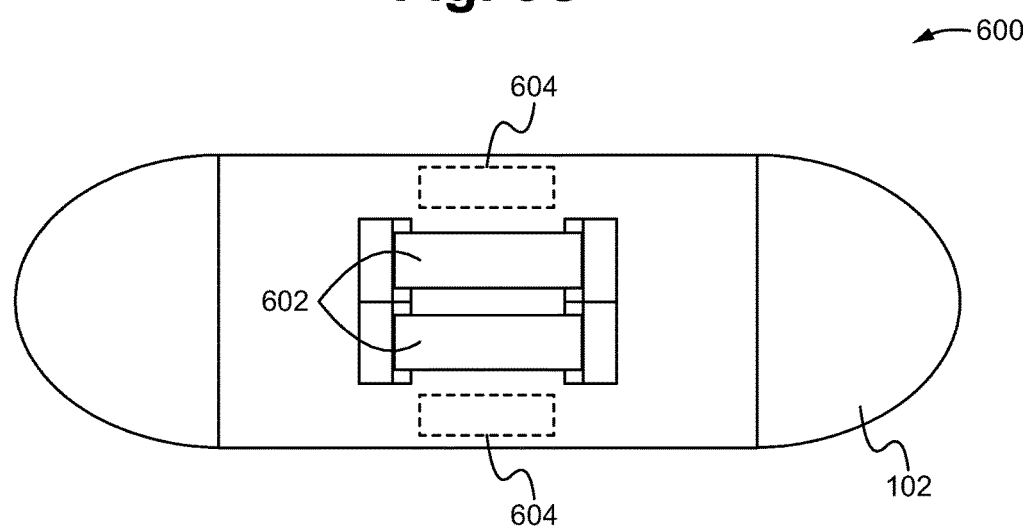
FIG. 6D illustrates a top view of a pitch propelled vehicle with a plurality of side-by-side ground contacting members according to some embodiments.
Figure 6E:
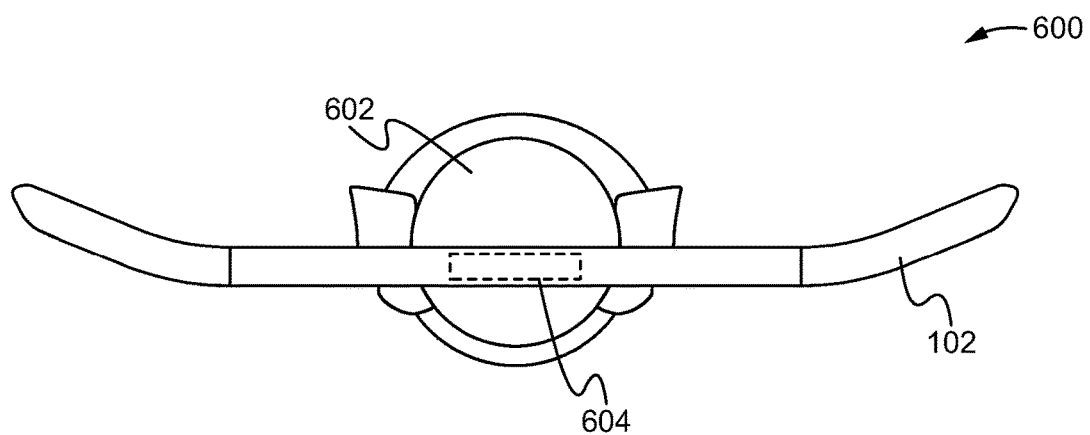
FIG. 6E illustrates a side view of a pitch propelled vehicle with a plurality of side-by-side ground contacting members according to some embodiments.
Figure 6F:
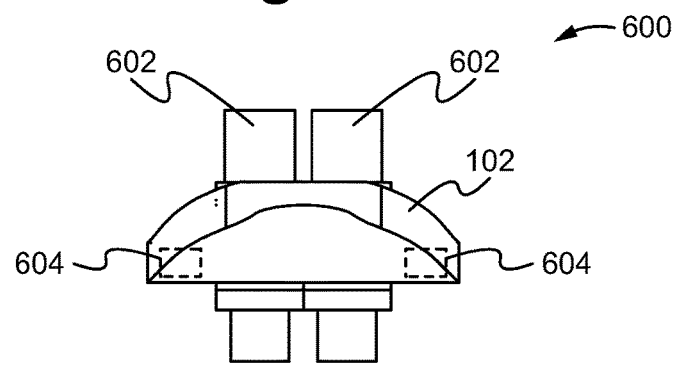
FIG. 6F illustrates a front view of a pitch propelled vehicle with a plurality of side-by-side ground contacting members according to some embodiments.

FIG. 5 illustrates a flow chart of a method of using a pitch propelled vehicle with a folding feature according to some embodiments. As shown in FIG. 5, a vehicle 100, 400 having a folding feature is provided at the step 502. One or more sections 402 of the board 102 are pivoted/rotated about one or more axis via one or more hinges 404 such that the board 102 is in a folded position at the step 504. In some embodiments, the method comprises two or more ends of the board 102 from different sections 402 of the board 102 being coupled together in the folded position with one or more fasteners 412. In some embodiments, the fasteners 412 are locked together in the folding position with a locking mechanism. One or more sections 402 of the board 102 are pivoted/rotated about one or more axis via one or more hinges 404 such that the board 102 is in an unfolded position at the step 506. In some embodiments, the method comprises two or more faces of the board 102 from different sections 402 of the board 102 being coupled together in the folded position with one or more fasteners 410. In some embodiments, the fasteners 410 are locked together in the folding position with a locking mechanism. In some embodiments, one or more steps of the method described in FIG. 5 is able to be combined with the method described in FIG. 3 in order to describe a method of operating and/or folding the vehicle. As a result, the method provides the advantage of enabling the board 102 to be folded such that it occupies a smaller area when stored or not in use.

FIGS. 6A-6F illustrate top perspective, bottom perspective, top, bottom, side and front views, respectively, of a pitch propelled vehicle 600 with a plurality of side-by-side ground contacting members according to some embodiments. The pitch propelled vehicle 600 shown in FIGS. 6A-F is able to be substantially similar to the pitch propelled vehicles 100 and/or 400 described in FIGS. 1A-E and 4A-F except for the differences described herein. In particular, detailed description and/or illustration of the shared features of the vehicles 100/400 and 600 have been omitted for the sake of brevity. As shown in FIGS. 6A-E, the vehicle 600 comprises a plurality of ground-contacting members 602 positioned side-by-side and one or more additional sensors 604. The members 602 are each able to be substantially similar to the ground-contacting member 104 and further able to be aligned with each other such that both are able to rotate about a single axis of rotation. In some embodiments, the members 602 are able to share a single axle (e.g. hollow axle as shown or solid axle as shown in FIG. 4A). Alternatively, the members 602 are each able to have a separate axle (e.g. hollow or solid). For example, the separate axles are able to have separate biasing elements (e.g. shock absorbers; springs) that enable the axles to separately and independently flex when force is applied (wherein the biasing elements bias the members 602 in an aligned position and enable but resist deviation from that aligned position). Thus, in such embodiments the axles and/or members 602 are able to move with respect to each other (e.g. deviate from their resting alignment with each other) when the board 102 is tilted side to side (e.g. perpendicular to the pitch about the axles).

In some embodiments, the ground-contacting members 602 share a single drive assembly 106. Alternatively, the members 602 are each able to have their own of one or more of the components (a-g) of the assembly 106 (such that the vehicle 600 has two or more of those components). For example, each of the members 602 is able to have a separate motor 106a, but be controlled by a single controller 106c that controls both motors 106a. Similarly, in some embodiments the ground-contacting members 602 share one or more grips 108, one or more guards 103 and/or one or more scrapers 109. Alternatively, the members 602 are each able to have their own (e.g. separate sets) grips 108, guards 103 and/or scrapers 109. Additionally, it should be noted that one or more of the above components, grips, guards and/or scrapers are able to be omitted. Like in previous embodiments, the one or more motors 106a are operably and/or mechanically coupled to the ground-contacting members 602 in order to cause the ground-contacting members 602 to rotate and thereby stabilize and move the vehicle 600. The drive assembly or assemblies 106 are able to cause the ground-contacting members 602 to rotate at the same rate or differing rates as described below.

The additional sensors 604 are able to be substantially similar to the sensors 106e and are positioned off-center with respect to the axis of the elongated dimension of the board 102. In particular, as shown in FIGS. 6A-E the additional sensors 604 are able to straddle the ground contacting members 602 such that they are able to sense a distance to the surface below the left and right sides of the board, respectively. These distances are then able to be used to dynamically determine the side-to-side tilt of the board 102. The additional sensors 604 are able to be coupled and operate in the same manner as the sensors 106e such that they are operatively (e.g. electrically) coupled with the controller or controllers 106c in order to transmit signals to the controllers 106c based on their input. As shown in FIGS. 6A-E, the sensors 604 are able to be partially housed within and positioned on the bottom of the board 102 on either side (left and right) of the ground-contacting members 602. Therefore, as described below with reference to the controllers 106c, based on these measured distances (and, for example, the preset distances of the sensors 604 from the ground-contacting members 602) the controllers 106c are able to determine the side tilt of the board 102 relative to the ground. Alternatively, the additional sensors 604 are able to be positioned on other portions of the board 102 (asymmetrically or symmetrically). In some embodiments, the sensors 604 are only positioned on a single side (left or right) of the board 102. Indeed, although the Figures show two sensors 604, any number of sensors 604 are able to be used.

Alternatively, one or more of the sensors 604 are able to be pitch-with-respect-to-gravity sensors (e.g. gyroscopes; accelerometers) that are able to detect when and how much the board 102 tilts to the side with respect to gravity. Alternatively, one or more of the sensors 604 are able to be deflection or movement sensors that sense a quantity that one of the ground-contacting members 602 moves/shifts with respect to the other ground-contacting member 602 (wherein the amount of vertical shift is proportional to a left or right side tilt of the board 102). For example, the sensors 604 are able to be distance, electromagnetic or capacitive sensors that detect shifting in alignment between the ground-contacting members 602 based on the moving apart or together of two conductive portions (e.g. electrified plates) which thereby alters the conductance and/or distance measured between the plates. In particular, in some such embodiments using deflection or alignment changes sensors, the vehicle 600 is able to comprise two separate axles (and/or biasing elements), one for each of the members 602 as described above. As a result, the axles and/or members 602 are able to deflect or change in alignment with respect to each other when the board 102 is tilted to the left or right side, which is then able to be measured by the deflection sensors 604 and transmitted to the controllers 106c in order to determine the side-to-side tilt and adjust the rotation rate of one or both of the members 602 accordingly. For example, the deflection/alignment change is able to result in a change of capacitance and/or distance between the two members 602 and/or axles. In such embodiments, the sensors 604 are able to be positioned within, between or adjacent to the members 602 and/or axles.

In operation, if no side-to-side tilt is detected, the vehicle 600 operates in the same manner as described above with respect to the vehicle 100 except that, instead of a single ground-contacting member, both of the plurality of ground-contacting members 602 are caused to rotate at (or approach) the desired velocity and direction at the same time. For example, if the controller 106c determines that the board 102 is pitched in the fore/aft direction at a first level, the controller(s) 106c causes both of the ground-contacting members 104 (via the motor(s) 106a) to slow down, speed up and/or reverse direction in order to approach and eventually match a desired velocity, acceleration and/or torque associated with the pitch of the first level. However, unlike vehicle 100, in vehicle 600 if a side-to-side tilt is detected by the sensors 604, the controller(s) 106c adjust the forces applied to the individual ground-contacting members 602 such that there is a velocity or rotational rate difference between the members 602 (e.g. one member 602 is rotating faster than the other member 602).

Specifically, the controller 106c determines the tilt of the board 102 to the left or right side based on the input from one or more of the additional sensors 604. If the sensors 604 are distance sensors, the tilt is determined based on the sensed distance between one or both the left and right sides of the board 102 and the ground (or surface below the board 102). Specifically, this determination is able to be substantially the same as the pitch determination described above with respect to vehicle 100 except it relates to the left/right tilt of the board 102 instead of the fore/aft pitch. If the sensors 604 are gravity sensors, the tilt is determined based on the sensed left or right tilt with respect to gravity. If the sensors 604 are alignment/movement sensors, the tilt is determined based on the length of movement/deflection, change in capacitance between or misalignment between the ground-contacting members 602 and/or their axles. In any case, based on the determined tilt, the controller 106c causes the motors 106a to apply a greater force to the ground-contacting member 602 in the direction away from the tilt. For example, if the board 102 is tilted toward the right (such that the right side is lower than the left side), the ground-contacting member 602 that is farthest from the right side of the board 102 is rotated at a greater velocity or rate than the other ground-contacting member 602 (and vice versa), wherein the difference in force applied or velocity/rotational rate is based on the degree of tilt measured. Generally, the greater the tilt measured (e.g. the lower one side of the board 102 is compared to the other side), the greater the difference between the force applied or velocity of the members 602. As described above, if zero tilt is detected, no difference is applied.

In some embodiments, the desired differential is achieved by increasing the force applied/velocity of the member 602 farthest from the tilt as described above until the differential is achieved. For example, if both members 602 would be rotated by the controller(s) 106c at 100 rotations per minute based on the pitch of the board 102 (e.g. the base desired rotation rate), but the tilt indicates that there should be a differential of 10 rotations per minute, the controller(s) 106c are able to increase the rotational rate of the member 602 farthest from the tilt direction until it equals 110 rotations per minute (i.e. 10 rotations per minute greater than the other member 602). Alternatively, the reverse is able to be used, where the closest member 602 to the tilt direction is decelerated from the base desired rotation rate until the desired differential is achieved. Alternatively, a combination of acceleration and deceleration is able to be used to achieve the desired differential. For example, the rate of the farthest member 602 is able to be increased by half the desired differential quantity and the rate of the closest member 602 is able to be decreased by half of the desired differential quantity. Alternatively, any other division of the differential quantity as applied to the adjustment of the member rotation is able to be used (e.g. 0-100% acceleration and 0-100% deceleration where the acceleration percentage plus the deceleration percentage equals 100%). As a result, in general, when a user leans to tilt the board 102 in the left or right directions, the member rotational rate difference caused by controller 106c will cause the vehicle 600 to turn (as it moves forward) in the direction of the tilt (e.g. right or left). Accordingly, the vehicle 600 provides the advantage of enabling improved turning based on detected tilting of the board 102.

In some embodiments where an amount of deceleration based on tilt is utilized, the deceleration is able to be prevented from decreasing the rate below a threshold rotational rate (e.g. near zero) such that the decreased rate does not reach below the rate (e.g. below zero or negative). In some embodiments, when the base desired rotational rate is zero (e.g. there is zero fore/aft pitch), if a tilt is detected the controller(s) 106c will enable the rate to be decreased below the threshold rotational rate to enable the board 102 to spin in place. In particular, in such embodiments the method of achieving the differential when the base desired rotational rate is zero (e.g. acceleration only, deceleration only or a combination of acceleration and deceleration) is able to be different than the method used when the base desired rotational rate is greater than zero.

In order to adjust the actuation of the motors 106a (and therefore the ground-contacting members 602), the controller 106c is able to finely encode (e.g. greater than 1,000 counts per revolution granularity) and monitors the position of the ground-contacting members 602 relative to the board 102. Using this detected current position as feedback, the controller 106c is able to utilize sinusoidal commutation to control the actuation of the motors 106a and thus the force applied to the ground-contacting members 602. Alternatively, other types of commutation, such as trapezoidal (or "six-step") commutation, are able to be used. In some embodiments, the controller 106c is able to incorporate a control loop feedback mechanism in order to analyze and adjust/compensate the control of the motors 106a based on the feedback (i.e. the detected current position of the ground-contacting members 602). For example, the controller 106c is able to incorporate a closed loop proportional-integral-derivative (PID) control feedback loop that receives the feedback, and based on the feedback transmits one or more error corrections signals that the controller 106c uses to adjust the commutation and/or control of the motors 106a. Alternatively, the PID controller is able to be open loop and/or other types of control loop feedback mechanisms are able to be used as are well known in the art. Alternatively, the controller 106c is able to control operation of the vehicle 600 without feedback.

Figure 7:
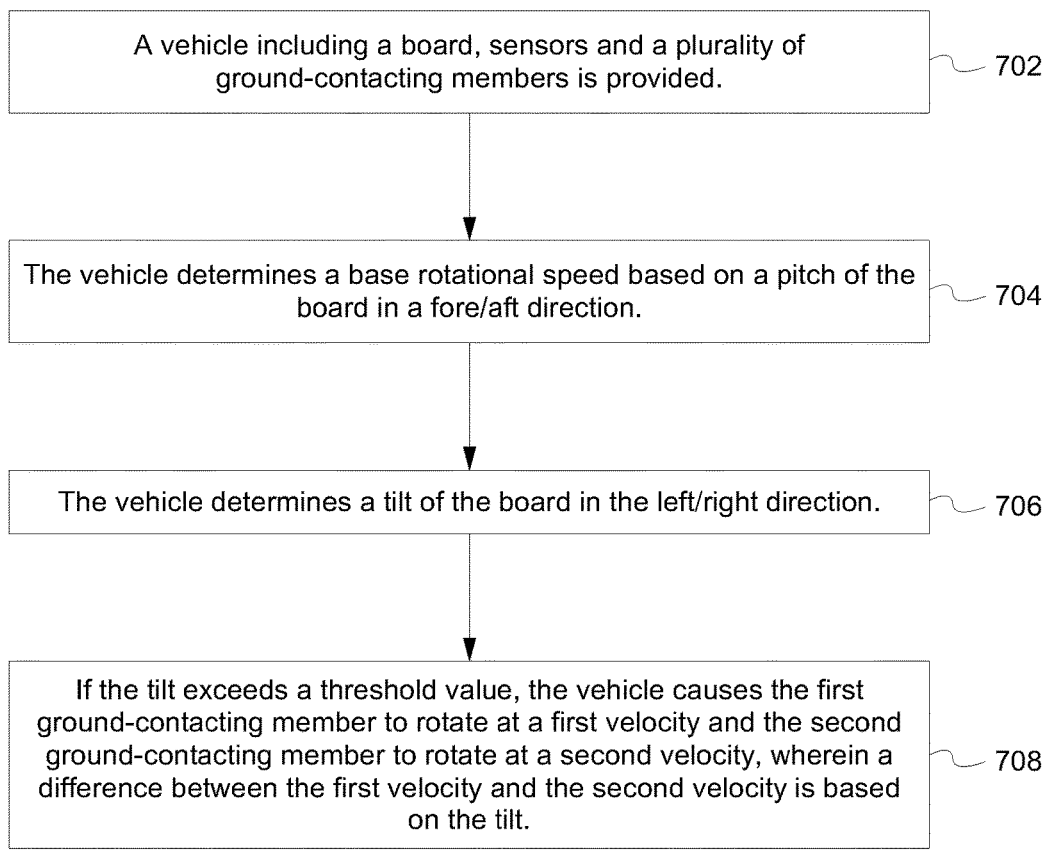
FIG. 7 illustrates a method of operating a pitch propelled vehicle with a plurality of side-by-side ground contacting members according to some embodiments.

FIG. 7 illustrates a method of operating a vehicle 600 according to some embodiments. As shown in FIG. 7, a vehicle 600 including a board 102, sensors 604 and a plurality of ground-contacting members 602 is provided at the step 702. The vehicle determines a base rotational speed based on a pitch of the board 102 in a fore/aft direction at the step 704. The vehicle determines a tilt of the board 102 in the left/right direction (e.g. perpendicular to the fore/aft direction) at the step 706. If the tilt exceeds a threshold value, the vehicle causes the first ground-contacting member 602 to rotate at a first velocity and the second ground-contacting member 602 to rotate at a second velocity, wherein a difference between the first velocity and the second velocity is based on the tilt at the step 708. In some embodiments, one or both of the group consisting of the first velocity and the second velocity are different than the base rotational speed in an amount that is based on the tilt.

In some embodiments, the difference is caused by slowing the rotation of one of the member 602, but not the other members 602. In some embodiments, the difference is caused by speeding up the rotation of one of the members 602, but not the other member 602. In some embodiments, the difference is caused by slowing one of the members 602 and speeding up the other of the members 602. In such embodiments, the controller of the vehicle is able to determine the proportion of velocity difference to cause by speeding up the member 602 rotation and the proportion of the velocity difference to cause by slowing down the member 603 rotation. In some embodiments, the proportion is based on the base speed of the vehicle (e.g. the rotational speed based solely on the pitch). For example, at higher base speeds a greater proportion of the difference is able to be caused by slowing one of the members 602 rather than speeding up one of the members 602, whereas at lower base speeds a greater proportion of the difference is able to be caused by speeding up one of the members 602 rather the slowing.

In some embodiments, if the base rotational speed is equal to zero and the tilt exceeds the threshold value, the first velocity has a different direction than the second velocity such that the first ground-contacting member 602 rotates in a different direction than the second ground-contacting member 602 (e.g. causing the board 102 to spin). In some embodiments, the method further comprises determining the tilt with respect to a surface below the board 102 based on one or more distances of the board 102 from the surface as detected by the tilt sensors 604. In some embodiments, the method further comprises determining the tilt with respect to gravity using the gyroscopic sensors 604. In some embodiments, the method further comprises detecting a deviation distance from a resting alignment of the first ground-contacting member 602 with respect to the second ground-contacting member 602 and determining the tilt based on the detected deviation distance. In some embodiments, the method further comprises determining the pitch based on one or more distances of the board 102 from a surface below the board 102 as detected by the pitch sensors.

The pitch propelled vehicle system including a plurality of ground-contacting members, device and method described herein has numerous advantages. Specifically, as described above the vehicle provides the advantage of altering the base rotational velocity based on tilt in order to more easily facilitate the turning of the vehicle. Moreover, it provides the advantage of increasing balance due to multiple ground-contacting members.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. For example, in some embodiments the drive assembly 106 is able to comprise a locking module or mechanism that enables a user to lock the vehicle in order to prevent theft. In particular, the controller 106c is able to be configured to prevent the vehicle 100 from operating unless a password is received via a user input, a RF signal is received that matches a predetermined signal, bluetooth connection is made to a mobile computing device having an identifier that is recognized, and/or other appropriate locking/unlocking methods.

What is claimed is:

1. A vehicle for carrying a user comprising:
    a board having an elongated dimension and a shorter dimension perpendicular to the elongated dimension;
    a first ground-contacting member coupled with the board and configured to rotate about a first axis that is parallel to the shorter dimension;
    a second ground-contacting member coupled with the board and configured to rotate about a second axis parallel to the shorter dimension, wherein the first and second ground-contacting members are adjacent to each other such that when at rest the first ground-contacting member and the second ground-contacting member have a resting alignment with respect to each other;
    one or more deflection sensors coupled with the drive elements, wherein the deflection sensors determine a misalignment value of the first and second ground-contacting members by measuring a distance that the alignment of the first ground-contacting member and the second ground-contacting member deviates from the resting alignment; and one or more motorized drive elements coupled with the first and the second ground-contacting members, wherein the drive elements:
  determine a base rotational speed based on a pitch of the board about the first axis;
  determine a tilt of the board about the elongated dimension based on the misalignment value; and
  if the tilt exceeds a threshold value, cause the first ground-contacting member to rotate at a first velocity and the second ground-contacting member to rotate at a second velocity, wherein a difference between the first velocity and the second velocity is based on the tilt.

2. The vehicle of claim 1, wherein one or both of the group consisting of the first velocity and the second velocity are different than the base rotational speed in an amount that is based on the tilt.

3. The vehicle of claim 1, wherein, if the base rotational speed is equal to zero and the tilt exceeds the threshold value, the first velocity has a different direction than the second velocity such that the first ground-contacting member rotates in a different direction than the second ground-contacting member.

4. The vehicle of claim 1, further comprising one or more tilt sensors coupled with the drive elements, wherein the drive elements determine the tilt with respect to a surface below the board based on one or more distances of the board from the surface as detected by the tilt sensors.

5. The vehicle of claim 4, wherein at least one of the tilt sensors is positioned on a first end of the shorter dimension of the board and at least another one of the tilt sensors is positioned on a second end of the shorter dimension of the board that is opposite from the first end.

6. The vehicle of claim 5, wherein the tilt is calculated by determining a difference between the one or more distances and an average of two or more of the distances.

7. The vehicle of claim 1, further comprising one or more gyroscopic sensors coupled with the drive elements, wherein the drive elements determine the tilt with respect to gravity using the gyroscopic sensors.

8. The vehicle of claim 1, wherein the distance is measured in a direction perpendicular to the shorter dimension and the elongated dimension of the board.

9. The vehicle of claim 1, wherein the first ground-contacting member and the second ground-contacting member each have a separate axle such that the axle of the first ground-contacting member and the axle of the second ground-contacting member are able to move with respect to each other.

10. The vehicle of claim 1, further comprising one or more pitch sensors coupled with the drive elements, wherein the drive elements determine the pitch based on one or more distances of the board from a surface below the board as detected by the pitch sensors.

11. The vehicle of claim 1, wherein the board as balanced by the first and second ground-contacting members is unstable with respect to tipping about the first axis when the motorized drive elements are not in operation, and the motorized drive elements are configured to automatically balance the board with respect to tipping about the first axis when the motorized drive elements are in operation.

12. A method of operating a vehicle having an elongated board, the method comprising:
  providing a vehicle comprising:
    a board having an elongated dimension and a shorter dimension perpendicular to the elongated dimension;
    a first ground-contacting member coupled with the board and configured to rotate about a first axis that is parallel to the shorter dimension;
    a second ground-contacting member coupled with the board and configured to rotate about a second axis parallel to the shorter dimension, wherein the first and second ground-contacting members are adjacent to each other such that when at rest the first ground-contacting member and the second ground-contacting member have a resting alignment with respect to each other;
    one or more deflection sensors coupled with the drive elements, wherein the deflection sensors determine a misalignment value of the first and second ground-contacting members by measuring a distance that the alignment of the first ground-contacting member and the second ground-contacting member deviates from the resting alignment; and
    one or more motorized drive elements coupled with the first and the second ground-contacting members; and
  with the drive elements:
    determining a base rotational speed based on a pitch of the board about the first axis;
    determining a tilt of the board about the elongated dimension based on the misalignment value; and
    if the tilt exceeds a threshold value, causing the first ground-contacting member to rotate at a first velocity and the second ground-contacting member to rotate at a second velocity, wherein a difference between the first velocity and the second velocity is based on the tilt.

13. The method of claim 12, wherein one or both of the group consisting of the first velocity and the second velocity are different than the base rotational speed in an amount that is based on the tilt.

14. The method of claim 12, wherein, if the base rotational speed is equal to zero and the tilt exceeds the threshold value, the first velocity has a different direction than the second velocity such that the first ground-contacting member rotates in a different direction than the second ground-contacting member.

15. The vehicle of claim 12, wherein the vehicle further comprises one or more tilt sensors coupled with the drive elements, the method further comprising, with the drive elements, determining the tilt with respect to a surface below the board based on one or more distances of the board from the surface as detected by the tilt sensors.

16. The method of claim 15, wherein at least one of the tilt sensors is positioned on a first end of the shorter dimension of the board and at least another one of the tilt sensors is positioned on a second end of the shorter dimension of the board that is opposite from the first end.

17. The method of claim 16, wherein the tilt is calculated by determining a difference between the one or more distances and an average of two or more of the distances.

18. The method of claim 12, wherein the vehicle further comprises one or more gyroscopic sensors coupled with the drive elements, the method further comprising, with the drive elements, determining the tilt with respect to gravity using the gyroscopic sensors.

19. The method of claim 12, wherein the distance is measured in a direction perpendicular to the shorter dimension and the elongated dimension of the board.

20. The method of claim 12, wherein the first ground-contacting member and the second ground-contacting member each have a separate axle such that the axle of the first ground-contacting member and the axle of the second ground-contacting member are able to move with respect to each other.

21. The method of claim 12, wherein the vehicle further comprises one or more pitch sensors coupled with the drive elements, the method further comprising, with the drive elements, determining the pitch based on one or more distances of the board from a surface below the board as detected by the pitch sensors.

22. The method of claim 12, wherein the board as balanced by the first and second ground-contacting members is unstable with respect to tipping about the first axis when the motorized drive elements are not in operation, and the motorized drive elements are configured to automatically balance the board with respect to tipping about the first axis when the motorized drive elements are in operation.

23. A motorized skateboard-like vehicle for carrying a user, the vehicle comprising:
- a board having an elongated dimension and a shorter dimension perpendicular to the elongated dimension;
- a first ground-contacting member coupled with the board and configured to rotate about a first axis that is parallel to the shorter dimension;
- a second ground-contacting member coupled with the board and configured to rotate about a second axis parallel to the shorter dimension, wherein the first and second ground-contacting members are adjacent to each other such that when at rest the first ground-contacting member and the second ground-contacting member have a resting alignment with respect to each other;
- one or more deflection sensors coupled with the drive elements, wherein the deflection sensors determine a misalignment value of the first and second ground-contacting members by measuring a distance that the alignment of the first ground-contacting member and the second ground-contacting member deviates from the resting alignment, and further wherein the board forms a perimeter around the first and second ground-contacting members;
- a plurality of distance sensors positioned on a bottom surface of the board and configured to measure a distance between the bottom of the board and a surface below the board; and
- one or more motorized drive elements coupled with the first and the second ground-contacting members, wherein the drive elements:
  - determine a base rotational speed based on a pitch of the board about the first axis;
  - determine a tilt of the board about the elongated dimension based on the misalignment value; and
  - if the tilt exceeds a threshold value, cause the first ground-contacting member to rotate at a first velocity and the second ground-contacting member to rotate at a second velocity, wherein a difference between the first velocity and the second velocity is based on the tilt.

* * * * *